(12) United States Patent
Harris et al.

(10) Patent No.: US 12,301,399 B2
(45) Date of Patent: *May 13, 2025

(54) SYSTEMS AND METHODS FOR SHAPED SINGLE CARRIER ORTHOGONAL FREQUENCY DIVISION MULTIPLEXING WITH LOW PEAK TO AVERAGE POWER RATIO

(71) Applicant: Spectral DSP Corp., New York, NY (US)

(72) Inventors: Fredric J. Harris, San Diego, CA (US); Martial Gander, Manassas, VA (US)

(73) Assignee: Spectral DSP Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,906

(22) Filed: Nov. 7, 2023

(65) Prior Publication Data
US 2024/0297813 A1 Sep. 5, 2024

Related U.S. Application Data

(63) Continuation of application No. 18/096,940, filed on Jan. 13, 2023, now Pat. No. 11,876,661, which is a
(Continued)

(51) Int. Cl.
*H04L 27/26* (2006.01)
*H04L 25/03* (2006.01)

(52) U.S. Cl.
CPC .... *H04L 27/2628* (2013.01); *H04L 25/03159* (2013.01); *H04L 27/2605* (2013.01); *H04L 27/2614* (2013.01)

(58) Field of Classification Search
CPC ............. H04L 27/2634; H04L 27/2636; H04L 27/2647; H04L 27/2649; H04L 27/26524;
(Continued)

(56) References Cited

U.S. PATENT DOCUMENTS 5,325,318 A * 6/1994 Harris .................. H03H 17/045
708/320
7,627,056 B1 * 12/2009 Harris ............... H04L 25/03853
375/350
(Continued)

FOREIGN PATENT DOCUMENTS

WO 2007/048278 A1 5/2007

OTHER PUBLICATIONS

Harris, F.J., Dick, C., Venosa, E. et al. Design considerations for channelizer based receivers in generalized frequency division multiplexed OFDM systems. Analog Integr Circ Sig Process 91, 315-327 (2017) (Year: 2017).
(Continued)

*Primary Examiner* — James M Perez
(74) *Attorney, Agent, or Firm* — Nelson Mullins Riley & Scarborough LLP; Anthony A. Laurentano

(57) ABSTRACT

System and methods for shaped single carrier orthogonal frequency division multiplexing with low peak to average power ratio are provided. The system receives an input signal and modulates the input signal to form Dirichlet kernels in a time domain to generate an offset Dirichlet kernel output time array where each Dirichlet kernel has a main lobe and a plurality of side lobes. Modulating the input signal suppresses a peak to average power ratio of the offset Dirichlet kernel output time array by reducing the plurality of side lobes of each Dirichlet kernel and respective amplitudes of the side lobes.

20 Claims, 22 Drawing Sheets

Related U.S. Application Data continuation of application No. 17/236,886, filed on Apr. 21, 2021, now Pat. No. 11,563,617.

(60) Provisional application No. 63/129,956, filed on Dec. 23, 2020, provisional application No. 63/014,682, filed on Apr. 23, 2020.

(58) Field of Classification Search
CPC .......... H04L 27/26526; H04L 27/2627; H04L 27/264; H04L 27/26412; H04L 25/02; H04L 25/03; H04L 25/03006; H04L 25/03159; H04L 27/26; H04L 27/2601; H04L 27/2602; H04L 27/2605; H04L 27/2614; H04L 27/2626–2628
See application file for complete search history.

(56) References Cited

U.S. PATENT DOCUMENTS

| | | | | |
|---|---|---|---|---|
| 8,090,037 | B1* | 1/2012 | Harris | H04L 25/03834 375/260 |
| 8,482,445 | B1* | 7/2013 | Harris | H03M 1/1038 341/118 |
| 8,532,084 | B2 | 9/2013 | Popovic et al. | |
| 8,582,675 | B1* | 11/2013 | Harris | H04L 27/0006 702/77 |
| 8,761,280 | B1* | 6/2014 | Harris | H04L 27/28 375/259 |
| 8,824,602 | B2* | 9/2014 | Das | H04L 25/03006 375/340 |
| 8,958,469 | B1* | 2/2015 | Harris | H04L 25/03159 375/230 |
| 8,958,510 | B1* | 2/2015 | Harris | H03H 17/0294 375/350 |
| 9,054,838 | B1* | 6/2015 | Harris | H04L 7/0087 |
| 9,112,735 | B1* | 8/2015 | Harris | H04K 3/45 |
| 9,148,327 | B1* | 9/2015 | Harris | H04L 27/2652 |
| 9,590,803 | B2* | 3/2017 | Derras | H04L 7/027 |
| 9,602,323 | B2* | 3/2017 | Lorca Hernando | H04L 27/26526 |
| 9,831,970 | B1* | 11/2017 | Harris | H03H 17/0266 |
| 10,541,847 | B2* | 1/2020 | Bouttier | H04L 27/2636 |
| 10,680,870 | B2* | 6/2020 | Levinbook | H04L 27/2636 |
| 11,063,804 | B2* | 7/2021 | Hadani | H04L 27/32 |
| 11,563,617 | B2* | 1/2023 | Harris | H04L 27/2605 |
| 11,876,661 | B2* | 1/2024 | Harris | H04L 27/26362 |
| 2007/0004465 | A1* | 1/2007 | Papasakellariou | H04W 52/325 455/571 |
| 2007/0071125 | A1* | 3/2007 | Tan | H04L 5/0048 375/260 |
| 2007/0183386 | A1* | 8/2007 | Muharemovic | H04L 5/023 375/150 |
| 2007/0183520 | A1* | 8/2007 | Kim | H04L 1/0003 375/260 |
| 2008/0117868 | A1* | 5/2008 | Maruyama | H04W 52/0251 455/507 |
| 2008/0267157 | A1* | 10/2008 | Lee | H04L 27/2602 370/342 |
| 2009/0097466 | A1* | 4/2009 | Lee | H04L 1/1861 370/344 |
| 2009/0310589 | A1* | 12/2009 | Nangia | H04L 5/0007 370/344 |
| 2009/0316568 | A1* | 12/2009 | Harris | H04L 25/03853 370/203 |
| 2010/0067615 | A1 | 3/2010 | Dorpinghaus et al. | |
| 2010/0085865 | A1* | 4/2010 | Nilsbo | H04L 25/022 375/147 |
| 2011/0206163 | A1* | 8/2011 | Lowdermilk | G01R 23/16 375/316 |
| 2011/0231862 | A1* | 9/2011 | Walsh | G06F 13/00 719/318 |
| 2013/0013262 | A1* | 1/2013 | Allegra | G01R 23/167 708/300 |
| 2013/0182754 | A1* | 7/2013 | Das | H04L 25/03885 375/232 |
| 2015/0358193 | A1* | 12/2015 | Lorca Hernando | H04L 27/2636 370/329 |
| 2016/0006530 | A1 | 1/2016 | Nazarathy et al. | |
| 2017/0012596 | A1* | 1/2017 | Harris | H03H 17/0266 |
| 2017/0012598 | A1* | 1/2017 | Harris | H03H 17/0266 |
| 2018/0242287 | A1* | 8/2018 | Chae | H04J 13/00 |
| 2019/0058622 | A1* | 2/2019 | Bouttier | H04L 27/26134 |
| 2019/0222455 | A1* | 7/2019 | Sahin | H04L 27/2636 |
| 2019/0238189 | A1* | 8/2019 | Delfeld | H04J 11/00 |
| 2019/0268202 | A1* | 8/2019 | Levinbook | H04L 27/2614 |
| 2020/0036470 | A1* | 1/2020 | Olesen | H04L 27/0008 |
| 2020/0052947 | A1* | 2/2020 | Sahin | H04W 72/0453 |
| 2020/0100262 | A1* | 3/2020 | Dinan | H04W 72/121 |
| 2020/0186397 | A1 | 6/2020 | Tsatsanis et al. | |
| 2020/0313949 | A1* | 10/2020 | Hadani | H04L 27/2627 |
| 2020/0374054 | A1 | 11/2020 | Shattil | |
| 2021/0111938 | A1 | 4/2021 | Sahin et al. | |
| 2021/0226836 | A1* | 7/2021 | Sahin | H04L 27/2636 |
| 2021/0336828 | A1* | 10/2021 | Harris | H04L 27/26412 |
| 2021/0359889 | A1* | 11/2021 | Bouttier | H04L 27/2607 |
| 2022/0200635 | A1* | 6/2022 | Harris | H04B 1/30 |
| 2022/0200637 | A1* | 6/2022 | Harris | H04B 1/38 |
| 2022/0294680 | A1* | 9/2022 | Bouttier | H04L 27/2607 |
| 2023/0049687 | A1* | 2/2023 | Harris | H04L 27/2636 |
| 2023/0275796 | A1* | 8/2023 | Harris | H04L 27/26412 375/295 |
| 2024/0297813 | A1* | 9/2024 | Harris | H04L 27/2614 |

OTHER PUBLICATIONS

International Search Report and Written Opinion of the International Searching Authority dated Jul. 26, 2021, issued in connection with International Application No. PCT/US2021/028464 (16 pages).

Chung H-Y et al., "Analysis and optimization of PAPR in SC-FDMA systems," Information, Communications and Signal Processing (ICICS) 2011 8th International Conference ON, IEEE, pp. 1-5 (2013).

Extended European Search Report, EP Application No. 21791796.2, dated Apr. 3, 2024, 9 pages.

Harris, F. et al., "Non iterative techniques for low peak-to average power ratio OFDM signals," 2009 International Waveform Diversity and Design Conference, pp. 296-301 (2009) doi: 10.1109/WDDC.2009.4800364.

* cited by examiner

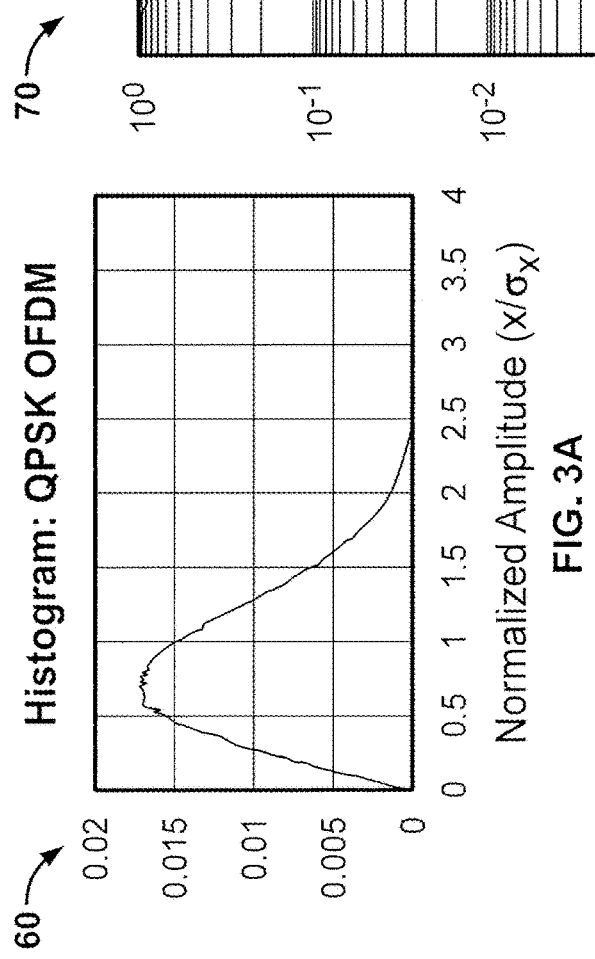
FIG. 3A
FIG. 3B
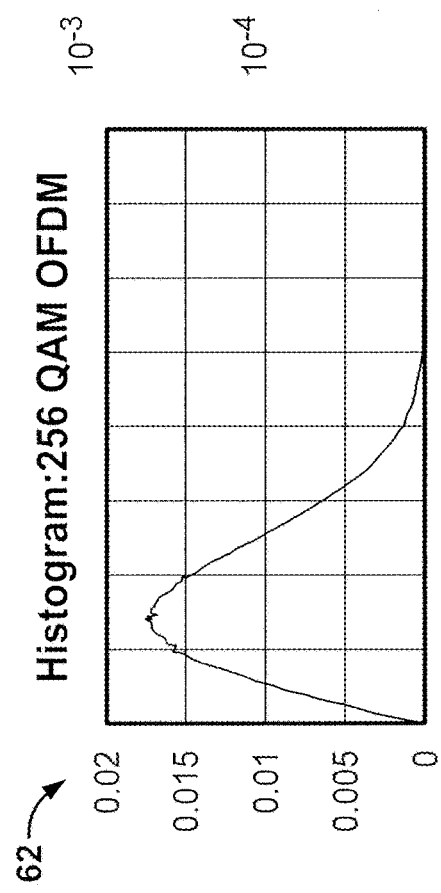
FIG. 3C

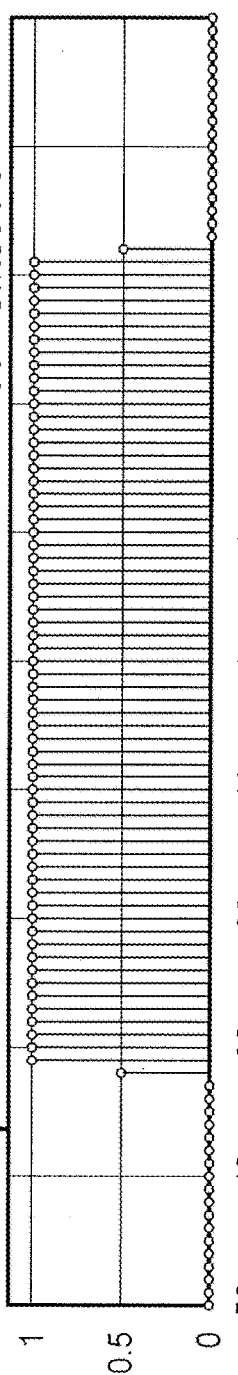
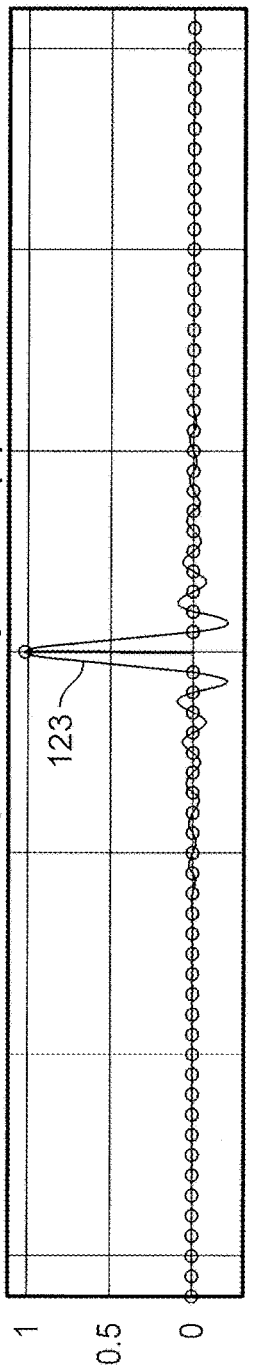
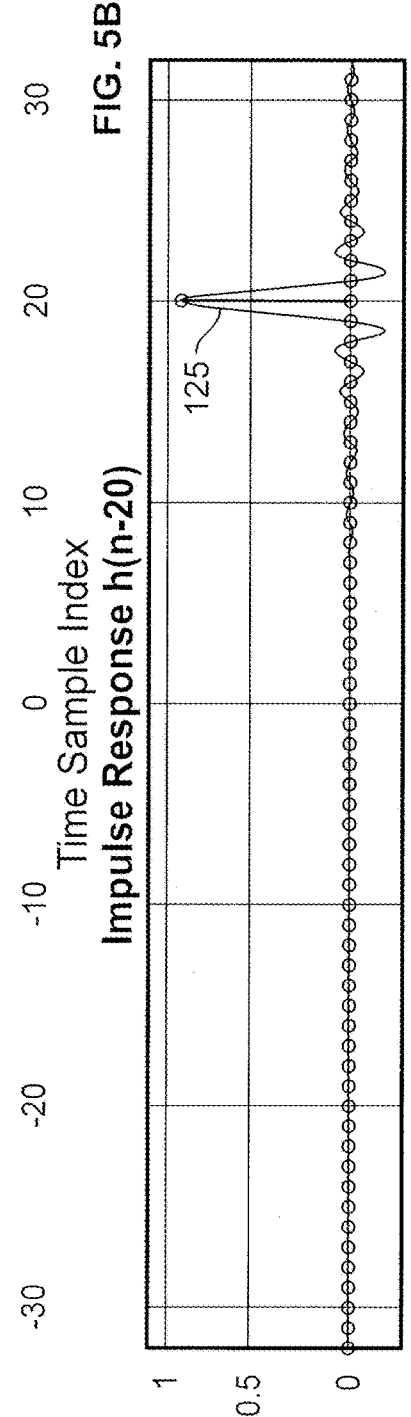
FIG. 5A
FIG. 5B
FIG. 5C

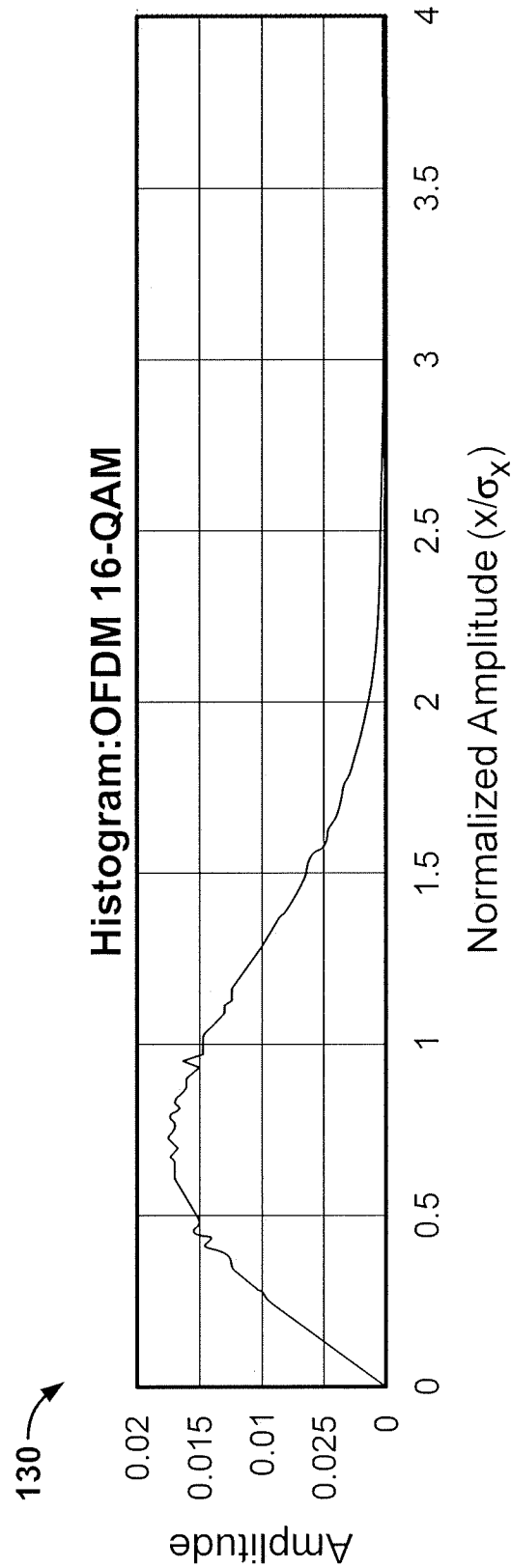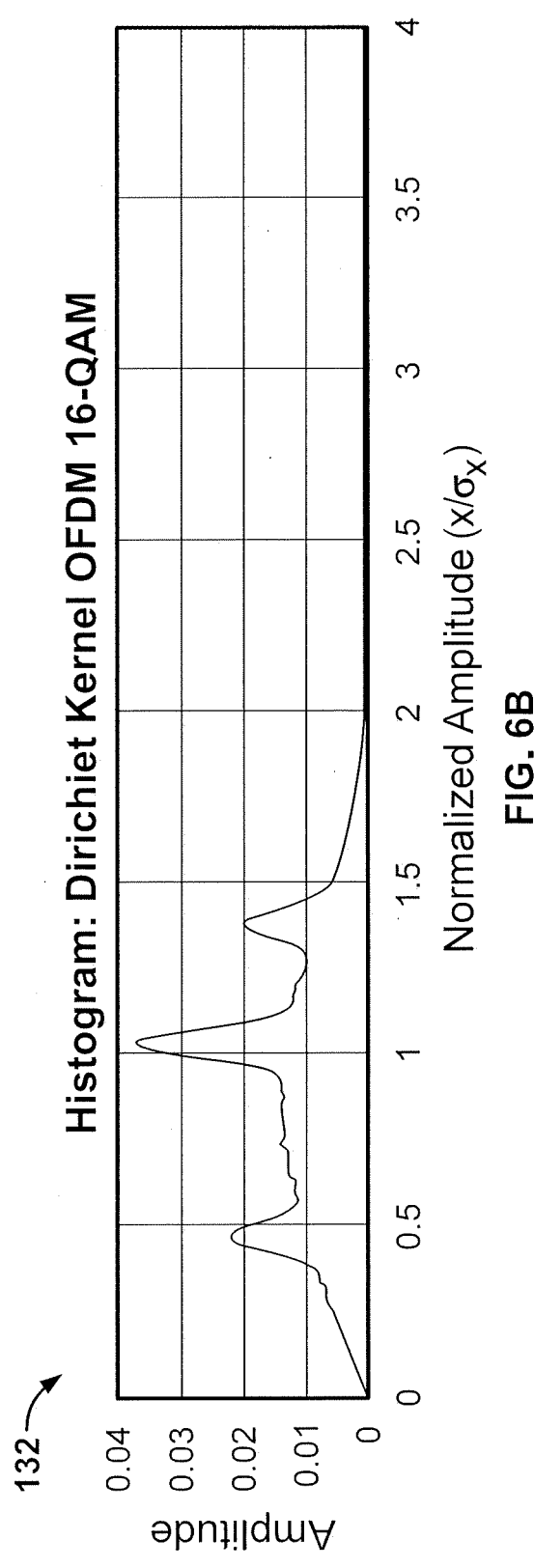

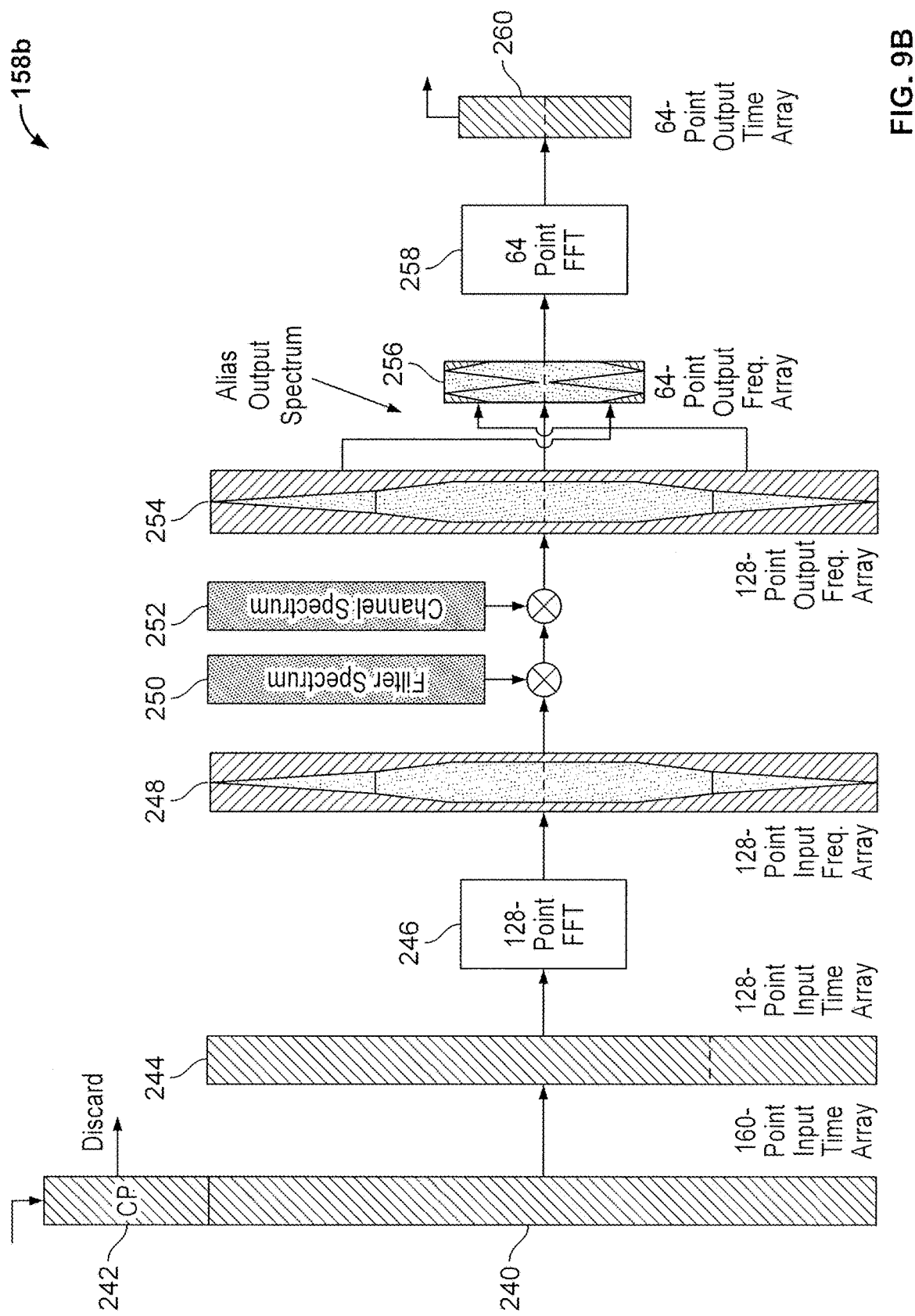

SYSTEMS AND METHODS FOR SHAPED SINGLE CARRIER ORTHOGONAL FREQUENCY DIVISION MULTIPLEXING WITH LOW PEAK TO AVERAGE POWER RATIO

CROSS-REFERENCE TO RELATED APPLICATIONS

This Application is a Continuation of U.S. application Ser. No. 18/096,940 filed Jan. 13, 2023, which is a Continuation of U.S. application Ser. No. 17/236,886 filed Apr. 21, 2021, now U.S. Pat. No. 11,563,617, which claims the benefit of U.S. Provisional Application No. 63/129,956 filed Dec. 23, 2020, and U.S. Provisional Application No. 63/014,682 filed Apr. 23, 2020. The entire contents of these applications are incorporated herein by reference in their entirety.

BACKGROUND

Technical Field

The present disclosure relates generally to the field of signal processing. More particularly, the present disclosure relates to systems and methods for shaped single carrier orthogonal frequency division multiplexing with low peak to average power ratio.

Related Art

Orthogonal Frequency Division Multiplexing (OFDM) signals have been applied to communication systems operating in frequency-selective fading channels due in part to their equalizer structure. OFDM signals can suffer from large peak to average power ratio (PAPR). This requires significant back-off of an average power level in a power amplifier (PA) to avoid clipping and the associated spectral re-growth due to the clipping. The PA back-off decreases an efficiency of the PA and available power from a transmitter.

Advanced OFDM-based systems can utilize a combination of techniques to mitigate excessive PAPR. For example, in a cellular system (e.g., 3GPP, 4G, or 5G), a modified waveform known as a Single-Carrier OFDM (SC-OFDM) is utilized in a mobile uplink segment where PA inefficiency can negatively impact battery life. The tradeoff for power efficiency in SC-OFDM is that spectral efficiency is approximately 50% or less compared with an unmodified OFDM utilized in a mobile downlink segment. Distortion minimizing techniques can be applied to the PA (e.g., dynamic envelop-tracking bias adjustment or complex pre-distortion) which require added real-time adjustment to either the PA bias or the modem output as a function of the instantaneous amplitude at an input of the PA. These PA compensation techniques can require additional computational and hardware resources which can increase a cost of user equipment.

Thus, what would be desirable is a system that automatically and efficiently processes signals using a SC-OFDM modulator with low peak to average power ratio. Accordingly, the systems and methods disclosed herein solve these and other needs.

SUMMARY

This present disclosure relates to systems and methods for shaped single carrier orthogonal frequency division multiplexing with low peak to average power ratio. The system receives an input signal and modulates the input signal to form Dirichlet kernels in a time domain to generate an offset Dirichlet kernel output time array where each Dirichlet kernel has a main lobe and a plurality of side lobes. Modulating the input signal suppresses a peak to average power ratio of the offset Dirichlet kernel output time array by reducing the plurality of side lobes of each Dirichlet kernel and respective amplitudes of the side lobes. The system modulates the input signal by receiving the input signal by an N-point time input array and transforming the N-point time input array to the frequency domain by a discrete Fourier transform to generate an N-point input frequency array. The system replicates the N-point input frequency array to generate an M-point input frequency array where M is greater than N and utilizes a filter to generate a shaped M-point output filtered frequency array by multiplying the M-point input frequency array and the filter. The system transforms the shaped M-point output filtered frequency array by an inverse discrete Fourier transform to generate an M-point offset Dirichlet kernel output time array. The system generates a cyclic prefix time array by replicating duration points of an end of the M-point offset Dirichlet kernel output time array, and appends the cyclic prefix time array to a beginning of the M-point offset Dirichlet kernel output time array to generate an M-point and duration point output time array.

BRIEF DESCRIPTION OF THE DRAWINGS

The foregoing features of the invention will be apparent from the following Detailed Description of the Invention, taken in connection with the accompanying drawings, in which:

FIGS. 3A-3B are magnitude histograms obtained from 1000 symbols of the two OFDM signal sets of FIGS. 2A-B;

FIG. 3C is a graph illustrating complementary cumulative density functions of the OFDM signal sets of FIGS. 3A-3B;

FIG. 5A is a graph illustrating a spectrum of a 64-point Dirichlet kernel in a 256-point FFT;

FIGS. 5B-5C are graphs respectively illustrating a time impulse response of the signal generator of FIG. 4 and a phase shift of the time impulse response of the signal generator of FIG. 4;

FIGS. 6A and 6B are magnitude histograms obtained from 1000 symbols of 16-QAM OFDM and 16-QAM SC-OFDM symbol sets;

FIGS. 9A-9B are diagrams respectively illustrating a shaped SC-OFDM modulator and a shaped SC-OFDM demodulator of the system of FIG. 8;

DETAILED DESCRIPTION

The present disclosure relates to systems and methods for shaped single carrier orthogonal frequency division multiplexing with low peak to average power ratio, as described in detail below in connection with FIGS. 1-17.

By way of background, Orthogonal Frequency Division Multiplexing (OFDM) utilizes the Inverse Discrete Fourier Transform (IDFT) as a modulator and a Discrete Fourier Transform (DFT) as a demodulator. Generally, the IDFT and the DFT are implemented by one of an Inverse Forward Fast Fourier Transform (IFFT) or a Forward Fast Fourier Transform (FFT) algorithms. It should be understood that the baseband representation of the modulated signal is a weighted sum of complex sinusoids. The complex sinusoids are the basis sequences of the DFT process where the sinusoids span N samples and include an integer number of cycles per N samples. These sinusoidal sequences are mutually orthogonal. The orthogonality can be understood as the inner product of two complex sinusoids that results in a sum equal to zero when the sinusoid frequencies are different or a sum equal to N when the sinusoid frequencies are the same.

In the OFDM process, an amplitude of the complex sinusoid is constant and is equivalent to a scaled rectangle window or gating sequence. The scaling term is formed by a mapping process from input bit sequences to an amplitude of cosine and sine at each frequency. It should be understood that a sampled complex sinusoid forms a continuous periodic spectrum which can be observed by a sampled DFT. A shape of the spectrum is a Dirichlet kernel which is a periodically extended version of the sin(x)/(x) or sinc function as shown below by Equation 1:

$$h(n) = \begin{cases} 1: & -(N-1)/2 \leq n \leq +(N-1)/2 \\ 0: & \text{elsewhere} \end{cases} \quad \text{Equation 1}$$

$$H(\theta) = \frac{\sin\left(N\frac{\theta}{2}\right)}{\sin\left(\frac{\theta}{2}\right)}, \quad -\pi \leq \theta \leq \pi$$

Equation 1 describes a non-causal version of the time series h(n). The actual time series h(n) would be causal with non-zero samples located in the interval 0≤n≤N−1 and the spectrum H(Θ) containing a phase shift term reflecting a time delay of the causal sequence version of h(n).

Figure 1A:
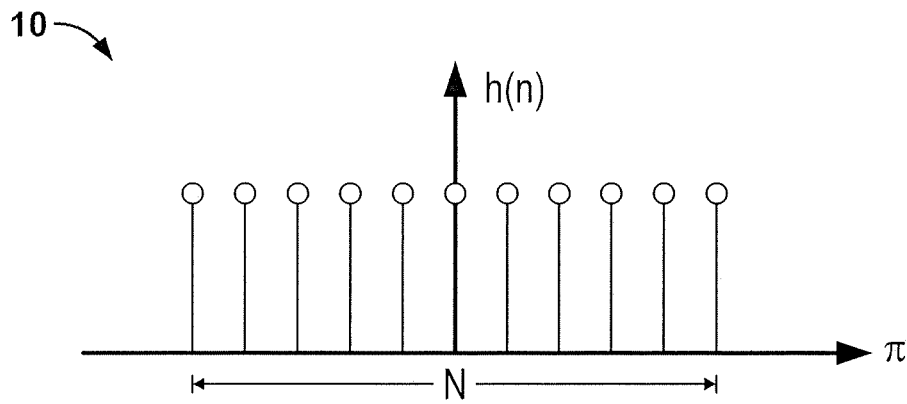
FIG. 1A is a graph illustrating a sampled data rectangle envelope h(n)
Figure 1B:
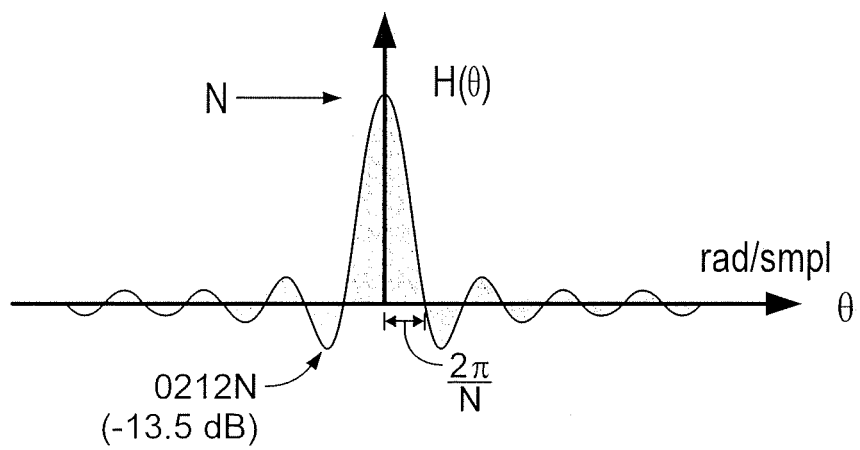
FIG. 1B is a graph illustrating a sampled data Fourier transform H(Θ) of FIG. 1A.
Figure 1C:
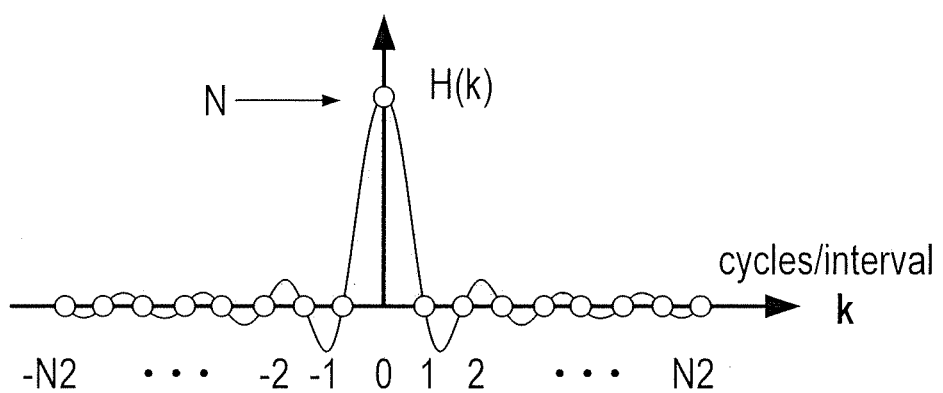
FIG. 1C is a graph illustrating a discrete Fourier transform H(k) of FIG. 1A.

The DFT forms H(k) which are uniformly spaced samples of the continuous spectrum H(Θ) where Θ=k2π/N. These sample locations correspond to the frequencies of the complex sinusoids with integer cycles per interval and coincide with the zeros of the spectrum H(Θ). It should be understood that the zero locations are also the zeros of the Z-transform H(Z) of the sequence h(n). FIGS. 1A-1C, respectively, illustrate the sequence h(n), the function H(Θ), and the sequence H(k). In particular, FIG. 1A illustrates a sampled data rectangle envelop h(n), FIG. 1B illustrates the sampled data Fourier transform H(Θ) of h(n) and FIG. 1C illustrates the DFT H(k) of h(n).

The initial OFDM sampled data sequence formed by the IDFT is shown by Equation 2 below:

$$h(n) = = \frac{1}{N}\sum_{k=0}^{N-1} H(k)\exp\left(j\frac{2\pi}{N}nk\right) \quad \text{Equation 2}$$

The amplitudes H(k) are complex numbers corresponding to constellation sample points of the M In-Phase and Quadrature grid values of the selected constellation suite M Quadrature Amplitude Modulated (M-QAM). Typical values include, but are not limited to, 64-QAM and 256-QAM.

A subset of the spectral weights H(k) have zero values. The zero valued weights are utilized to form an empty spectral span between the periodic spectral replicates of the occupied frequency band associated with the sampled data Fourier transform. This empty spectral interval is required by the process that utilizes Digital to Analog Converters (DACs) and smoothing filters to form continuous analog waveforms from the sampled data sequences. The empty spectral interval permits reasonable transition bandwidth requirements of the analog filters following the DAC. An interpolator following the output of the IDFT can be utilized to raise the sample rate of the modulated sampled data sequence. The resulting higher sample rate increases a spacing between the spectral replicates and reduces the order and therefore a cost of the analog filters following the DAC. The IDFT can also be utilized to interpolate the output time series while performing the modulation process. The IDFT can raise the sample rate and thereby increase the spacing between spectral replicates by performing a larger IDFT (e.g., by a factor of 2) and placing additional zero valued spectral samples in the increased number of spectral bins.

The output time sequence formed by Equation 2 will now be described. As shown in Equation 2, the amplitudes H(k) can be a list of random numbers drawn from a list of possible amplitudes. The multiple weighted sums at each position "n" in h(n) is then a sum of a large number of identically distributed random variables. By the central limit theorem, for each sample position, an amplitude of the in phase and an amplitude of the quadrature phase time is a Gaussian distributed random variable and the amplitude of the resulting complex number at each sample position is Rayleigh distributed. The Rayleigh distribution exhibits long tails with peak excursions between 3 to 4 times the root mean square (rms) signal level. As such, a final output power amplifier (PA) would have to back off approximately 9.5 to 12 dB to avoid clipping of the peak excursion signal levels. This is indicative of the high peak to average power ratio (PAPR) problem associated with an OFDM signal set.

Figure 2A:
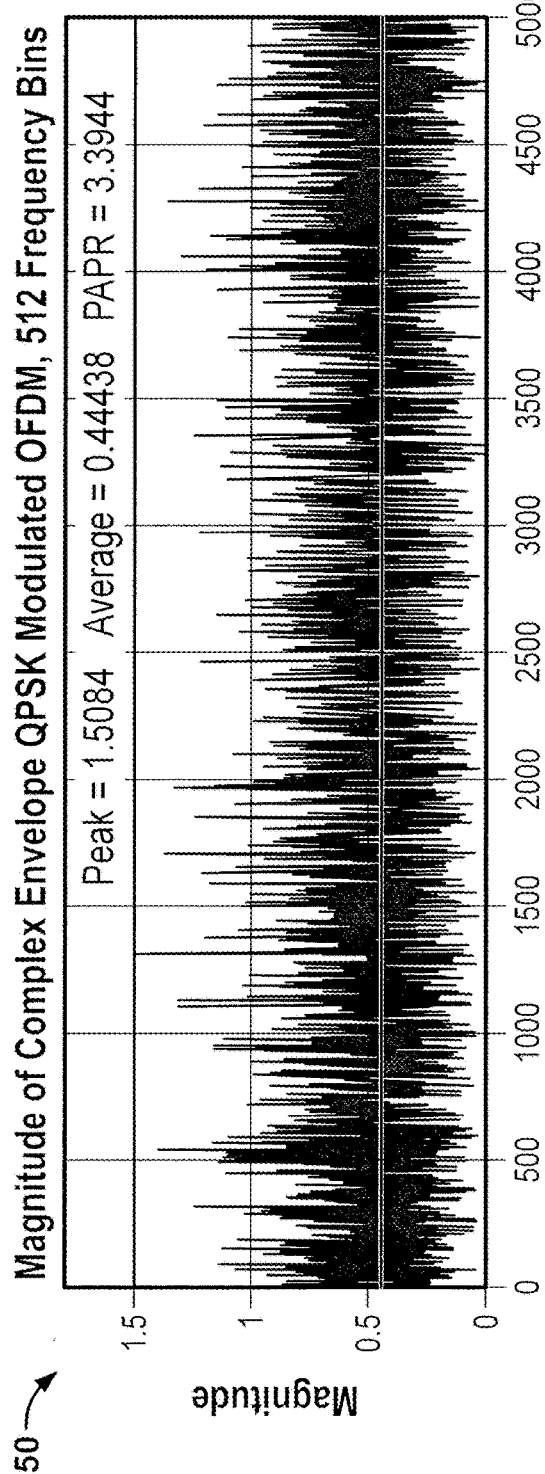
FIGS. 2A-2B are graphs illustrating the respective magnitudes of two OFDM signal sets.
Figure 2B:
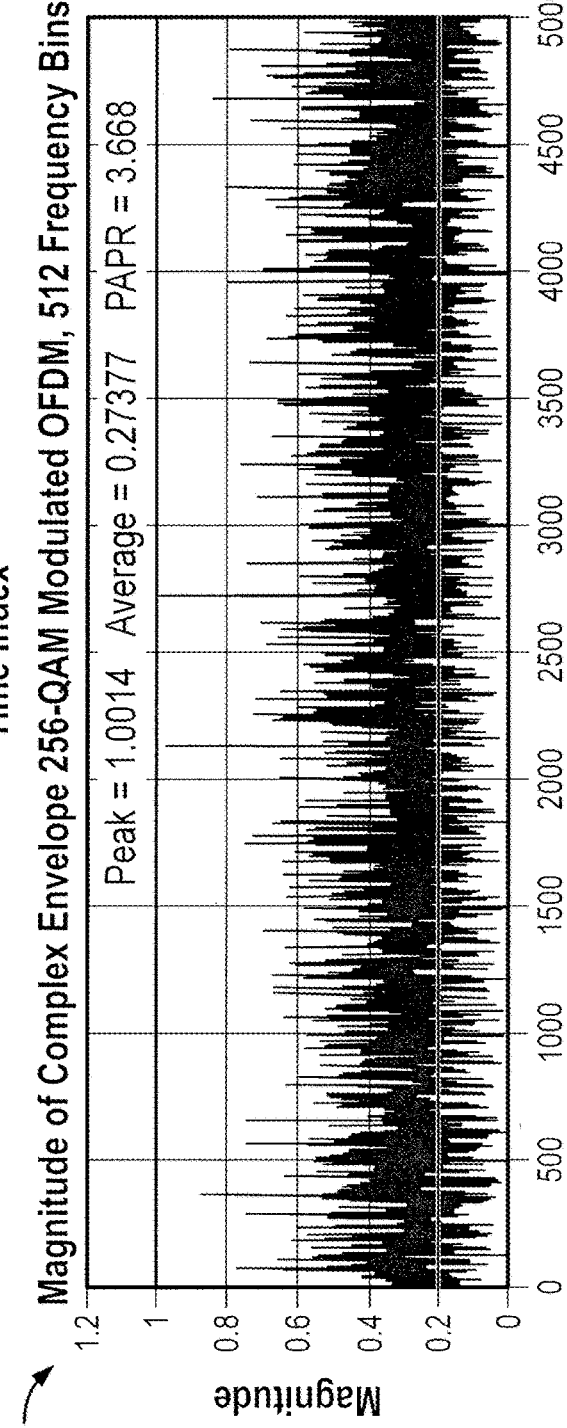

For example, FIGS. 2A-2B are graphs 50, 52 illustrating the respective magnitudes of two OFDM signal sets. In particular, FIGS. 2A and 2B are graphs 50, 52, respectively, illustrating Quadrature Phase Shift Keying (QPSK) and 256-QAM modulation with 512 frequency bins in a 1024 point IFFT where the sampled time signal extends over 1000 OFDM symbols including 1024 samples per symbol. Each signal set is normalized to unity variance and the PAPR of the two signal sets are 3.4 and 3.7 respectively. FIGS. 3A-3B are magnitude histograms 60, 62 obtained from 1000 symbols of the OFDM signal sets of FIGS. 2A-2B and FIG. 3C is a graph 70 illustrating complementary cumulative density functions of the OFDM signal sets of FIGS. 3A-3B. As shown in FIGS. 3A-3C, a probability that the magnitude exceeds 3 times the average magnitude for a unity variance signal is approximately 1 in 1000 such that approximately 1 in every 10 symbols will saturate if the saturation level is 3 times the average level. Saturation in OFDM is equivalent to an impulse added to the time series where the impulse has a broad flat bandwidth which disturbs every FFT bin in the symbol.

The high PAPR associated with an OFDM signal set is tolerable because OFDM provides for a desirable signal denoted by a collection of different frequency sinusoids. Sinusoids are special functions which, in their analog form, when propagating through systems described as linear equations, do not change their shape. Similarly, sinusoids are sequences which, in their sampled data form, when propagating through systems described as linear difference equations, do not change their shape. Accordingly, sinusoids are eigen-functions (or eigen-sequences) of linear differential (or difference) systems. Therefore, if a sinewave is differentiated and the derivative is scaled and added back to the original sinewave, the resulting sinewave has the same steady state shape as the original. As such, a system can change a size of a sinewave but cannot change its shape. Thus, when a sinusoid propagates through a channel and experiences the summation of a delayed and scaled version of itself due to multipath, the shape is preserved and the effect of the channel is a complex gain change, magnitude and phase or $A(f) \times \exp(j\Theta(f))$. Equalization, the inversion of the channel when sinusoids propagate through the channel, becomes a task of estimating the channel's sinusoidal steady state gain and applying a corrective multiplicative inverse. Since the modulator and demodulator of the OFDM signal set is a Fourier transform, the channel sinusoidal steady state gain at each frequency can be determined by probing the channel with a preamble and then applying the channel inversion gain correction to payload symbols with information gleaned from the channel by the probing preamble. OFDM is advantageous because the channel can be trivially inverted. This is an important consideration when evaluating wide bandwidth channels.

The standard model of a multipath channel is a tapped delay line and finite impulse response (FIR) filter where its delay spread function is the impulse response of the filter. Each frequency in a modulated OFDM signal will have a different impulse response and hence a different steady state frequency response. Each frequency in the modulation process is probed with a sinusoid at that frequency where the amplitude and phase at the modulator is known to the demodulator. The ratio of the output gain and phase to the input gain and phase presents, to the demodulator, estimates of the channel gain at each frequency.

During the modulation process it is important to avoid coupling between successive symbols known as inter symbol interference (ISI). ISI is the result of channel memory in its frequency dependent point spread function. The coupling of successive symbols can be avoided by inserting a time gap or guard interval between successive symbols with the gap duration exceeding the largest delay spread interval thereby rendering the ISI equivalent to zero.

Convolution can be problematic during the modulation process. For example, convolution of the modulated signal with the channel impulse response can cause a starting transient and a stopping transient as the time signal enters and leaves the channel. This transient causes amplitude modulation of the sinusoids in the signal set which breaks the orthogonality of the original rectangle enveloped signal set. Orthogonality is integral to the modulation process because it is essential to the orthogonal steady state gains of the equalizer process. Therefore, to preserve signal orthogonality, a segment of the back end of the symbol can be copied and appended to a front end of the signal. This appended segment is known as a cyclic prefix. Since the sinewaves in the modulation process include an integer number of cycles, the summed sequence is periodic in its own length such that the next sample at the right most edge is the first sample at the left most edge. Copying a segment of the back end to the front edge provides for forming, at the boundary, the periodic extension of the sequence and shifting the discontinuity at the former boundary to the left most edge of the appended segment. It should be understood that the appended cyclic prefix fits in the guard interval inserted between successive symbols. As such, when the sequence with the appended cyclic prefix is convolved with the channel, the starting transient of the current symbol resides in the interval including the cyclic prefix and the stopping transient from the previous symbol also resides in the cyclic prefix interval. With both transients in the interval including the cyclic prefix, the demodulator discards the cyclic prefix interval. Accordingly, there is no transient at the previous boundary because of the continuity of the cyclic prefix with the symbol. An attribute of the cyclic prefix in the convolution of the channel with the cyclic prefix appended signal is that, even though the convolution is a linear convolution, the cyclic prefix in that convolution makes the convolution appear to be a circular convolution. Accordingly, the cyclic prefix can be utilized to fool a linear convolution to become a circular, transient free circular convolution. This trick preserves the orthogonality of the IDFT basis set presented to and processed by the demodulator.

As described above, an OFDM signal can be formed with an N-point transform that forms an N sample interval containing a summation of weighted complex sinusoids. Each sinusoid contains an integer number of cycles. This is a sufficient condition for the sinusoid sequences to be mutually orthogonal. The number of sinusoids is less than the size of the IDFT as a technique to leave an empty spectral guard interval between spectral replicates. Successive symbols can be appended with guard intervals and cyclic prefaces to move the symbols through multipath channels without corrupting a structure of the modulated symbols. After signal acquisition, the guard interval of each is identified and discarded and the channel effects are removed by spectral gain corrections as signal conditioning during the demodulation process.

In a standard OFDM signal, a rectangle envelope is utilized in the time domain and a Dirichlet kernel is utilized in the frequency domain. Each of the orthogonal sinewaves utilizes the same time sequence rectangle envelope to form its signal component. The spectrum of each time domain sinusoid is the Dirichlet kernel offset in the frequency domain which is an integer multiple of $(2\pi/N)$ to form H(Θ−k×2π/N) where k is a number of cycles per interval in the time as well as the frequency offset index in the frequency domain.

Figure 4:
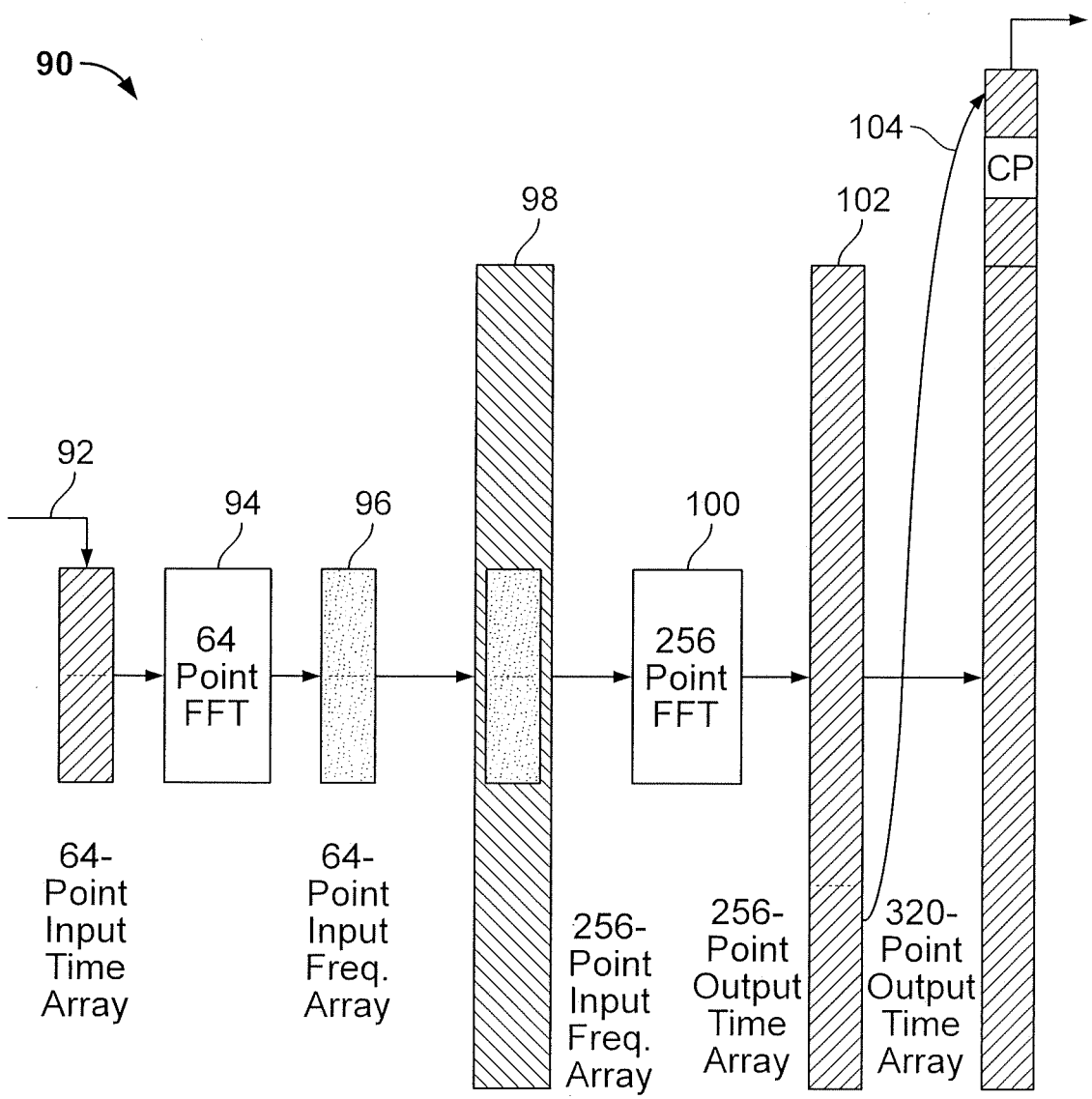
FIG. 4 is a diagram illustrating a SC-OFDM signal generator for forming offset Dirichlet kernels in the time domain.

PAPR can be reduced by interchanging the two functions such that the rectangle envelope sinusoids reside in the frequency domain and the offset Dirichlet kernels reside in the time domain. This interchange is possible given the symmetry of the Fourier transform but the algorithmic implementation thereof requires a slight modification. The initial step of the interchange involves the formation of Dirichlet kernel samples in the time domain. In this regard, FIG. 4 is a diagram 90 illustrating a SC-OFDM signal generator for forming offset Dirichlet kernels in the time domain. A 64-point input time array 92 receives, as an input, 64 constellation points with a selected grid density to the 64 addresses of the 64-point input time array. Then, a 64-point Discrete Fourier Transform (DFT) 94 is executed, resulting in a 64-point input frequency array 96. The 64 points are then unwrapped into 65 points with a half amplitude cut at address 32 and the points placed symmetrically about address 0 of a 256-point input frequency array 98. A 256-point Inverse DFT (IDFT) 100 is executed, resulting in the time domain via a 256-point output time array 102 with a 1 to 4 interpolated sum of scaled and offset Dirichlet kernels. Next, a subset of the samples of the 256-point output time array 102 is appended to a beginning of a subsequent output time array as its cyclic prefix thereby yielding a 320-point output time array 104. As mentioned above, the cyclic prefix can be appended to the subsequent output time array because every sum of the output sinusoids is periodic in the length of the output time array as is every individual sinewave in the original OFDM signal set.

FIG. 5A is a graph 120 illustrating a spectrum of a 64-point Dirichlet kernel in a 256-point FFT and FIGS. 5B-5C are graphs 122, 124 respectively illustrating a time impulse response of the signal generator of FIG. 4 and a phase shift of the time impulse response of the signal generator of FIG. 4. In particular, graphs 120, 122, 124 of FIGS. 5A-5C illustrate forming samples of a Dirichlet kernel by utilizing FFT and zero extended IDFT to perform time domain interpolation. Starting with a 64-point FFT, an impulse can be loaded in an address 0 with zeros in the remaining 63 addresses. There is only one minimum bandwidth time series that passes through these 64 samples and, as such, it is known that this is the Dirichlet kernel. It should be understood that the Dirichlet kernel is not visible because the sample rate has not been raised to view the samples between the zeros. A 64-point DFT is executed to obtain a spectrum of the single sample. The transform of the single impulse located at index 0 is 64 samples of a constant unit amplitude spectrum. The 64 samples are positioned symmetrically at an address 0 of a 256-point spectrum array. The contents of address 32 are divided in half such that half of the contents remain in address +32 and the other half of the contents are allocated to address −32 of the 256-point array. A 256-point IDFT is executed to return to the time domain with the time series passing through the initial 64 time samples but interpolated 1 to 4 to locate three samples between the initial input samples.

Graph 120 of FIG. 5A illustrates the constant levels obtained from the output array of the 64-point DFT. As mentioned above, these samples are positioned symmetrically about address 0 in the 256-point frequency array such that the half amplitudes at addresses −32 and +32 are evident. Graph 122 of FIG. 5B illustrates the 64 input sample to the 64-point input array to the 64-point DFT. A 256-point IDFT of the spectral array containing the zero extended output of the 64-point DFT is executed and the 256 samples are plotted as an overlay 123 on the 256-point time array including the initial single impulse at address 0. As such, graph 122 of FIG. 5B illustrates the 1 to 4 up-sampled Dirichlet kernel in the time domain. Graph 124 of FIG. 5C illustrates a phase shift with respect to FIGS. 5A-B. It should be understood that repeating the interpolation process described above with a single impulse located at address +20 would yield a spectrum at the output of the 64-point DFT having the same unit magnitude values riding on a complex sinusoid with 20 cycles per interval of length 64 where the phase term would reflect the time delay or offset from 0 in the time domain. For example, executing the unwrapping of the 64 spectral points including the half amplitude partition of address 32, symmetrically positioning these samples at address 0 of the 256-point time array, and executing the 256-point IDFT, would yield a 1 to 4 up-sampled Dirichlet kernel centered at address +20 (the initial position of this impulse response test). The 256 samples are plotted as an overlay 125 on the 256-point time array including the single impulse at address +20.

The Dirichlet kernels can be positioned in the time domain because Dirichlet kernels are sin(x)/x like signals where each Dirichlet kernel has a tall main lobe at its center and low level side lobes positioned away from the main lobe. When performing the sum of OFDM sinewaves, the sum at each location becomes large because the amplitude is carried by the complex sinusoid to all sample locations. This is not possible when performing the sum of SC-OFDM scaled and time offset Dirichlet kernels because the amplitude is localized and is not distributed to all sample locations. It should be understood that the main lobe of a Dirichlet kernel does not overlay the main lobe of a neighboring Dirichlet kernel but rather overlays the side lobes of the neighboring Dirichlet kernel. Accordingly, the weighted sum of Dirichlet kernels is dominated by the single large peaks of the respective Dirichlet kernels.

Figure 7:
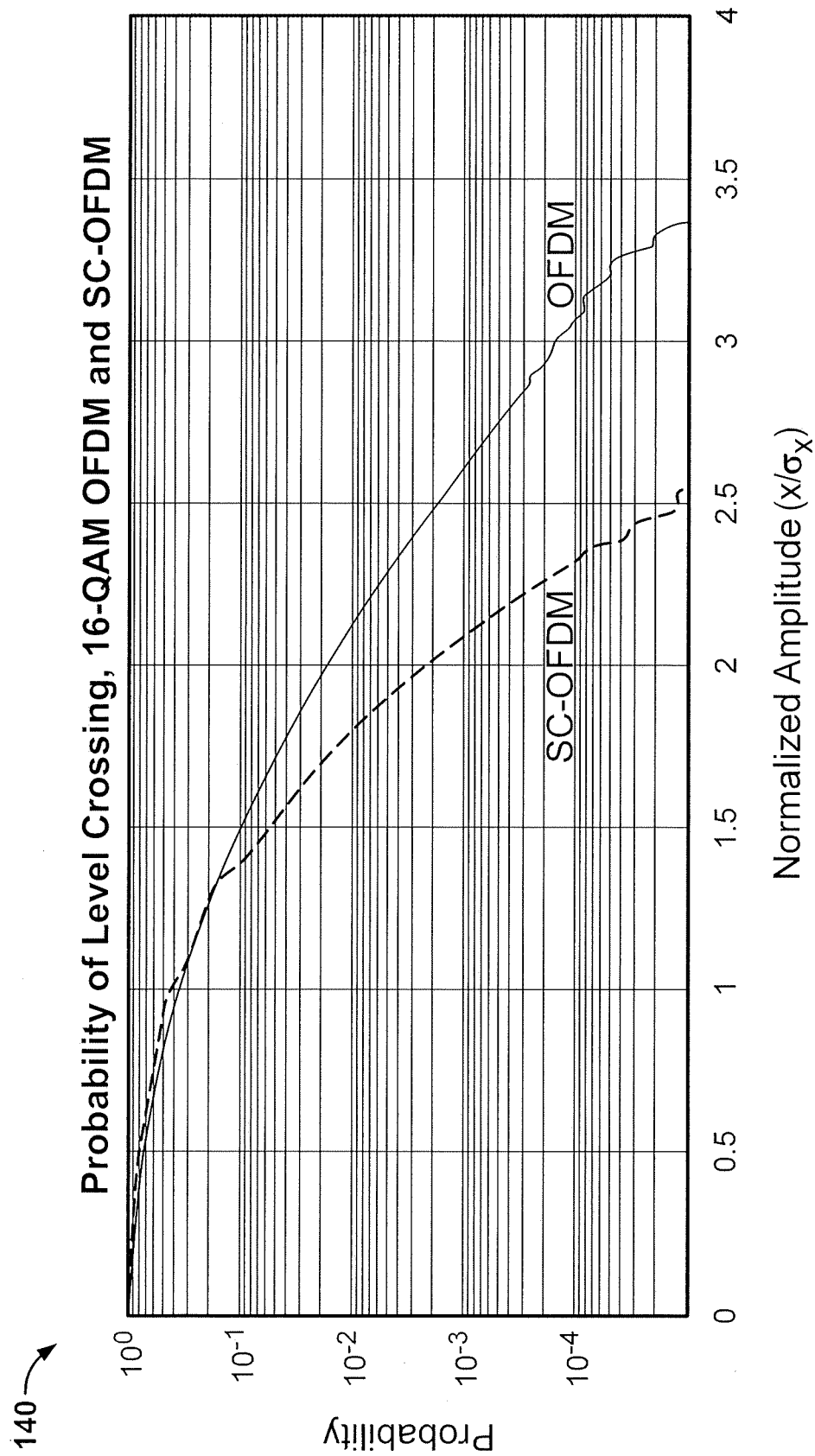
FIG. 7 is a graph illustrating complementary cumulative density functions of the 16-QAM OFDM and 16-QAM SC-OFDM symbol sets of FIGS. 6A-6B.

FIGS. 6A-6B and 7 validate the expected PAPR reduction of the SC-OFDM signal set. In particular, FIGS. 6A and 6B are magnitude histograms 130, 132 obtained from 1000 symbols of 16-QAM OFDM and 16-QAM SC-OFDM symbol sets where each symbol set includes 64 occupied frequency bins in a 256-point transform and FIG. 7 is a graph 140 illustrating complementary cumulative density functions for the 16-QAM OFDM and 16-QAM SC-OFDM symbol sets of FIGS. 6A-6B. As shown in FIGS. 6A and 6B, the magnitude histogram 130 of the 16-QAM OFDM symbol set illustrates a standard Raleigh distribution while the magnitude histogram 132 of the 16-QAM SC-OFDM symbol set illustrates 3 peaks associated with three radii circles of a 16-QAM constellation set where inner and outer circles include 4 constellation points and a middle circle includes 8 constellation points. As shown in FIG. 7, the SC-OFDM amplitude spread is reduced compared to the OFDM amplitude spread. In particular, at $10^{-4}$ probability, the SC-OFDM magnitude is approximately 72% of the OFDM magnitude which represents a 2.8 dB reduction in the PAPR.

As described above, the SC-OFDM process replaces complex sinusoids, the time domain basis functions of the DFT with Dirichlet kernels and the frequency domain basis functions of the DFT. The weighted sum of time shifted Dirichlet kernels has a smaller PAPR than the weighted sum of overlapped sinusoids (as shown in FIG. 7) due to their reduced interaction in the summation process. The time delayed Dirichlet kernels interact through the low level side lobes of respective kernels. Generally, this interaction is between a main lobe of a Dirichlet kernel and side lobes of a neighboring Dirichlet kernel because the side lobes decay inversely with a time offset as shown in the 1/x of the sin(x)/x function. The system of the present disclosure can realize additional PAPR suppression by reducing respective amplitudes of the Dirichlet kernel time domain side lobes as well as decreasing their number.

Figure 8:
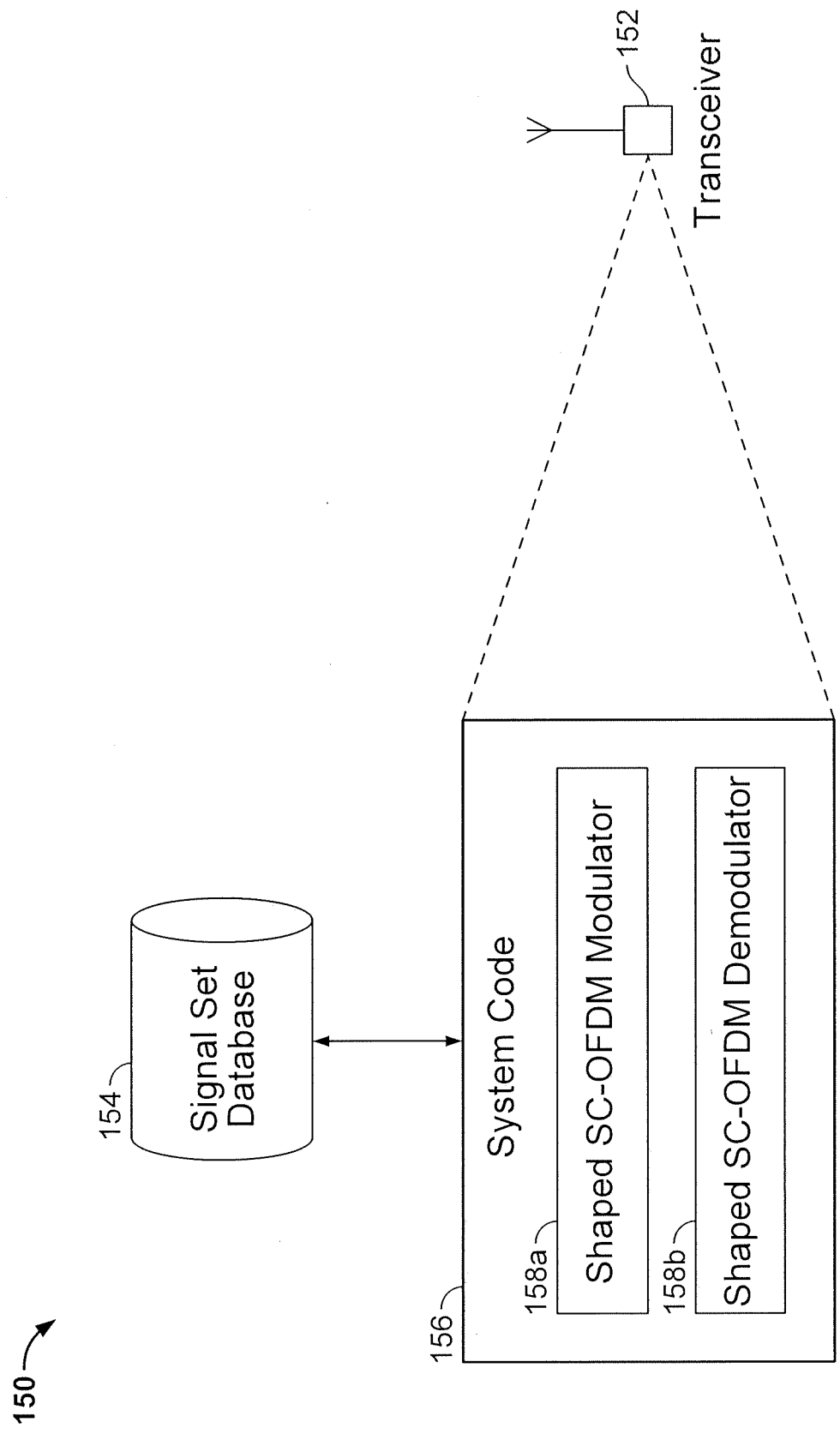
FIG. 8 is a diagram illustrating an embodiment of the system of the present disclosure.

FIG. 8 is a diagram illustrating an embodiment of the system 150 of the present disclosure. The system 150 could be embodied as system code 156 (e.g., firmware, software, etc.) executed by a processor of a radiofrequency transceiver 152. The transceiver could include, but is not limited to, a cellular transceiver (e.g., base station or mobile device supporting one or more communications protocols such as 3GPP, 4G, 5G, etc.), a satellite transceiver (e.g., an earth station or a satellite in space), a wireless networking transceiver (e.g., a WiFi base station or WiFi-enabled device), a short-range (e.g., Bluetooth) transceiver, or any other radiofrequency transceiver. The transceiver 152 executes the system code 156, which causes the transceiver 152 to generate a modified SC-OFDM signal set to reduce PAPR. Optionally, the code 156 could obtain one or more OFDM signals from a signal set database 154, if desired.

The code 156 (i.e., non-transitory, computer-readable instructions) could be stored on a computer-readable medium and executable by the transceiver 152 or one or more computer systems. The code 156 could include various custom-written software modules that carry out the steps/processes discussed herein, and could include, but is not limited to, a shaped SC-OFDM modulator 158a and a shaped SC-OFDM demodulator 158b. The code 156 could be programmed using any suitable programming languages including, but not limited to, C, C++, C#, Java, Python or any other suitable language. Additionally, the code 156 could be distributed across multiple computer systems in communication with each other over a communications network, and/or stored and executed on a cloud computing platform and remotely accessed by a computer system in communication with the cloud platform. The code 156 could communicate with the signal set database 154, which could be stored on the same transceiver as the code 156, or on one or more computer systems in communication with the code 156.

Still further, the system 150 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 8 is only one potential configuration. and the system 150 of the present disclosure can be implemented using a number of different configurations.

Figure 9A:
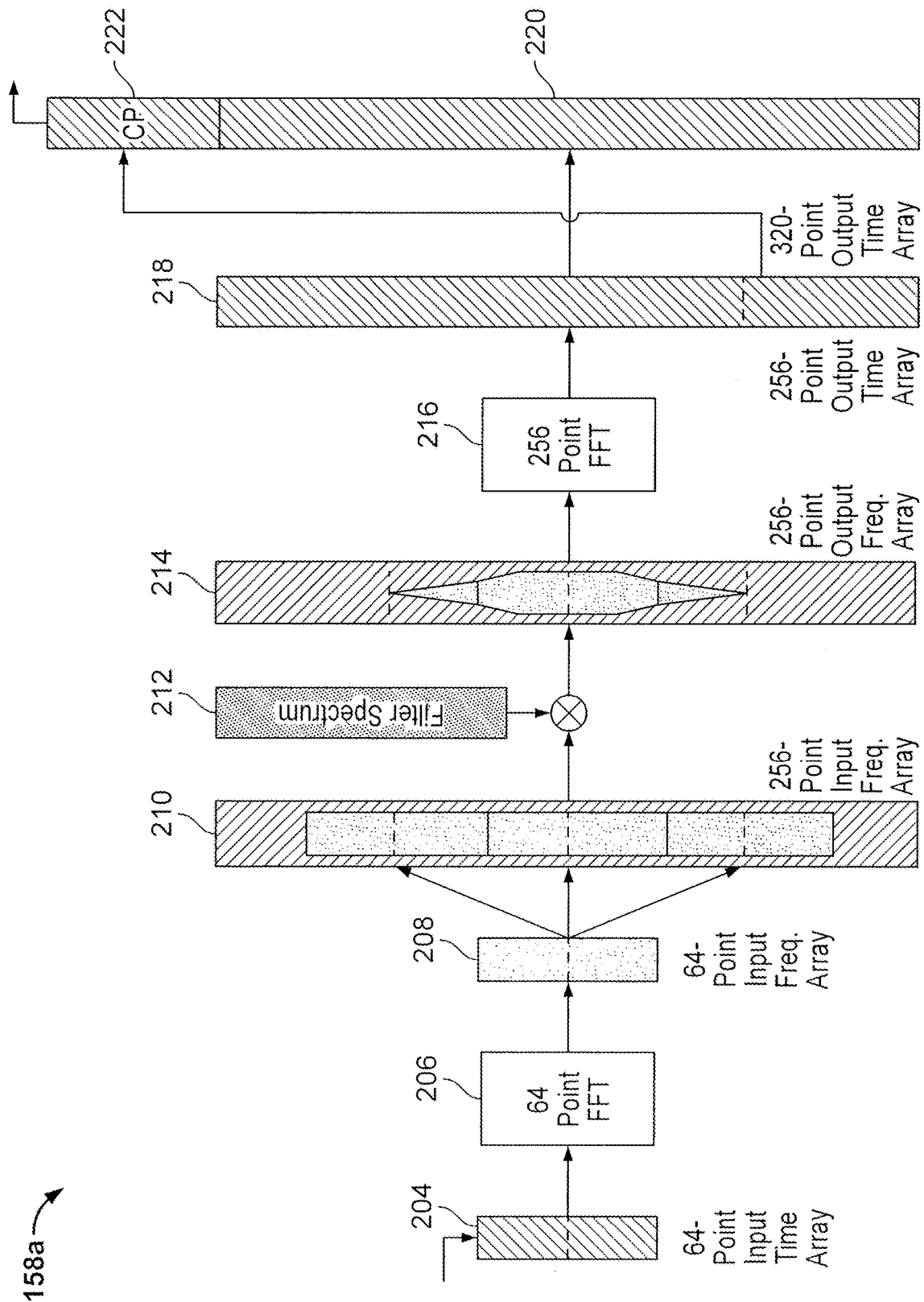

FIGS. 9A-9B are diagrams respectively illustrating a shaped SC-OFDM modulator 158a and a shaped SC-OFDM demodulator 158b of the system 150. As shown in FIG. 9A, the shaped SC-OFDM modulator 202a can include an N-point SC-OFDM offset Dirichlet kernel input time array 204 (e.g., a 64-point input time array), an N-point FFT 206 (e.g., a 64-point FFT), an N-point input frequency array 208 (e.g., a 64-point input frequency array), an M-point input frequency array 210 (e.g., a 256-point input frequency array), a filter spectrum array 212 (e.g., a Nyquist filter or Dirichlet kernel filter), an M-point filtered output frequency array 214 (e.g., a 256-point output frequency array), an M-point FFT 216 (e.g., a 256-point FFT), an M-point output time array 218 (e.g., a 256-point output time array), and an M-point output time array 220 (e.g., a 320-point output time array) including a cyclic prefix 222. As shown in FIG. 9B, the shaped SC-OFDM demodulator 202b can include an N-point input time array 240 (e.g., a 160-point input time array) including a cyclic prefix 242, an N-point input time array 244 (e.g., a 128-point input time array), an N-point FFT 246 (e.g., a 128-point FFT), an M-point input frequency array 248 (e.g., a 128-point frequency array), a filter spectrum array 250 (e.g., a Nyquist filter or Dirichlet kernel filter), a channel spectrum array 252, an M-point filtered output frequency array 254 (e.g., a 128-point output frequency array), an M-point output frequency array 256 (e.g., a 64-point output frequency array), an M-point FFT 258 (e.g., a 64-point FFT), and an M-point output time array 260 (e.g., a 64-point output time array).

Figure 10:
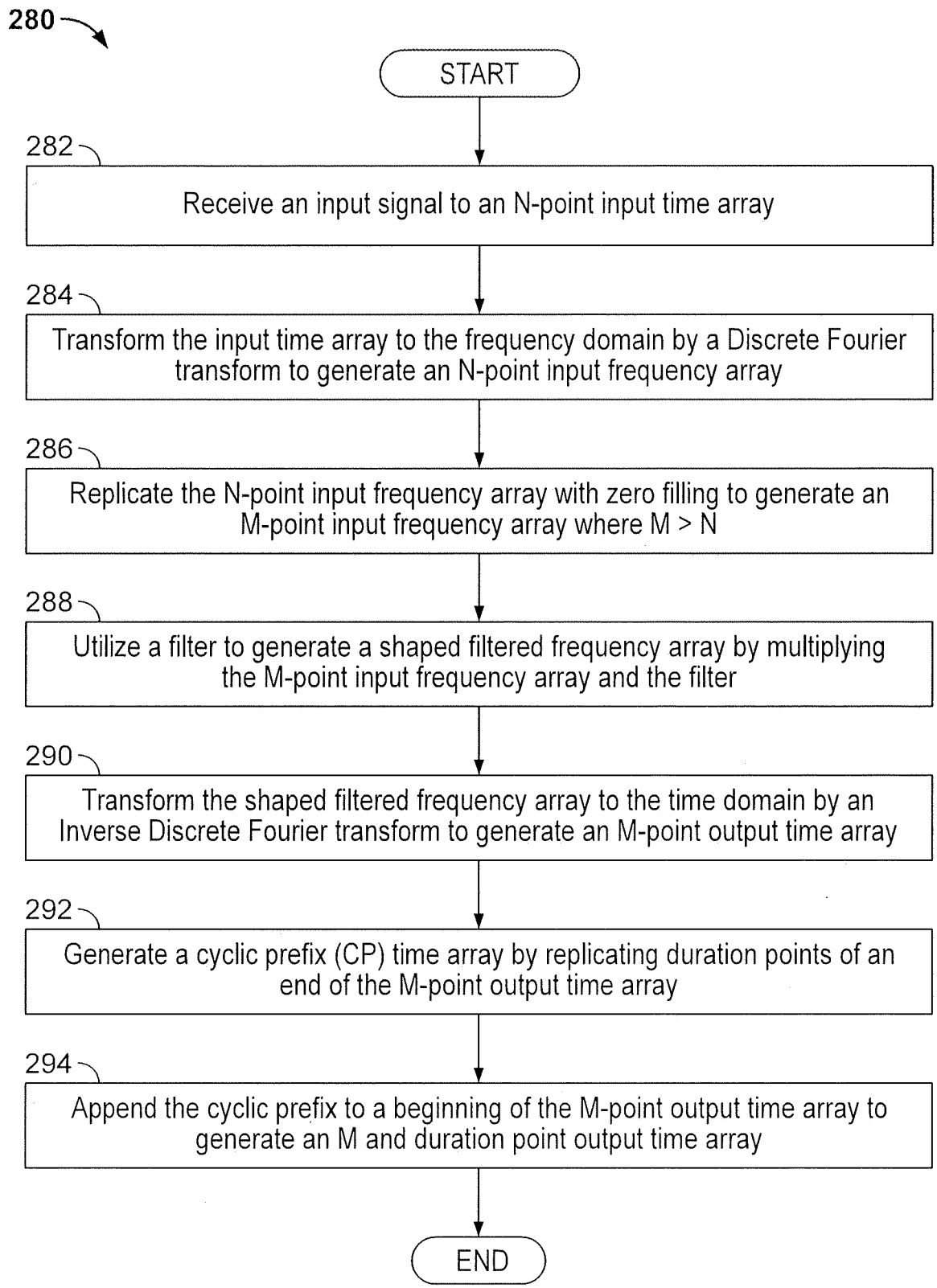
FIG. 10 is a flowchart illustrating overall processing steps carried out by the shaped SC-OFDM modulator of FIG. 9A.

FIG. 10 is a flowchart illustrating overall processing steps 280 carried out by the shaped SC-OFDM modulator 158a of the system 150 to generate Dirichlet kernel samples in the time domain to form an offset Dirichlet kernel output time array. Beginning in step 282, the system 150 receives, by an N-point input time array, an input signal. In step 284, the system 150 transforms the N-point input time array to the frequency domain by a N-point DFT (e.g., a 64-point DFT) to generate an N-point input frequency array. Then, in step 286, the system 150 replicates the N-point input frequency array with zero filling to generate an M-point input frequency array where M is greater than N.

Next, in step 288, the system 150 utilizes a filter to generate a shaped filtered frequency array by multiplying the M-point input frequency array and the filter which is equivalent to convolution in the time domain. The filter can be a Nyquist filter or a Dirichlet kernel filter having a square root of a low side lobe response characteristic. A Nyquist filter is utilized in a traditional QAM modem. It should be understood that in a QAM modulator, the Nyquist pulse in linearly convolved with the constellation samples while in the SC-OFDM modulator, the Dirichlet kernel is circularly convolved with the constellation samples with the circular convolution performed by a spectral product in the frequency domain.

The impulse response of the Nyquist filter is a time domain shape that supports a given symbol rate with zero ISI while minimizing the modulation bandwidth. The minimum modulation bandwidth is a spectral rectangle with two-sided bandwidth equal to the modulation rate. A known disadvantage of the minimum bandwidth Nyquist pulse is that its impulse response is infinitely long because its spectrum is discontinuous. This can be addressed by applying a finite width time domain window to the impulse response. For example, a window can be a rectangle with values of 1 in the desired span of the filter length and 0 elsewhere. The time domain product of the Nyquist impulse response and the applied finite duration window forms a finite duration impulse response having a spectrum obtained by the convolution of the ideal rectangular spectrum with the window's spectrum. Nyquist proposed a window whose transform was a half cycle of a cosine and the resulting filter is referred to as a cosine tapered Nyquist filter. The spectral convolution of the two functions widens the modulation bandwidth beyond the minimum rectangular bandwidth.

It should be understood that since the windowed time impulse response series does not have a rectangle spectrum, the system 150 splits the shaping process with the square-root spectra by performing half of the shaping at the shaped SC-OFDM modulator 202a and half of the shaping at the shaped SC-OFDM demodulator 202b similar to Nyquist filtered QAM modems. For the rectangle shaped spectrum, the shaping filter and the matched filter each have rectangle spectra and, as such, their product is also rectangle shaped.

With a spectral taper, each of the shaping filter and the matched filter have square root spectral shapes and, as such, their product is the cosine tapered Nyquist spectrum. The filters utilized in conventional QAM modems are referred to as SQRT cosine tapered Nyquist filters. It should be understood that the system 150 can utilize the SQRT cosine tapered Nyquist filters in the shaped SC-OFDM or can generate a tapered SQRT filter with an optimal window.

Referring back to FIG. 10, in step 290, the system 150 transforms the shaped filtered frequency array to the time domain by an N-point IDFT (e.g., a 256-point IDFT) to generate an M-point output time array. In step 292, the system 150 generates a cyclic prefix time array by replicating duration/length points (e.g., Q-points) of an end of the M-point output time array. It should be understood that the duration/length of the cyclic prefix array can depend on the a transient response of the system 150 and a worst-case external reflection delay in a given application. In step 294, the system 150 appends the cyclic prefix to a beginning of the M-point time array to generate an M and Q-point output time array.

Figure 11:
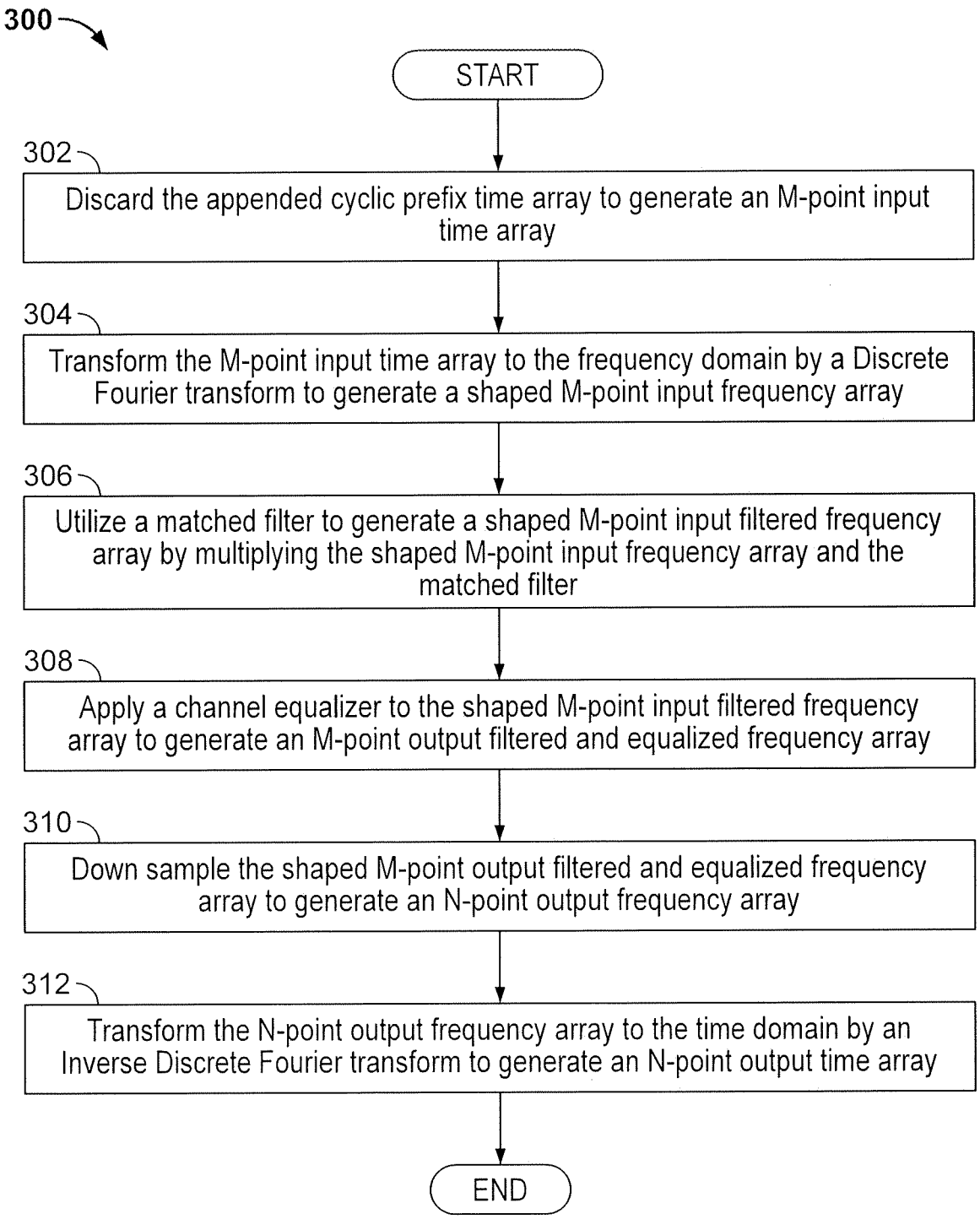
FIG. 11 is a flowchart illustrating overall processing steps carried out by the shaped SC-OFDM demodulator of FIG. 9B.

FIG. 11 is a flowchart illustrating overall processing steps 300 carried out by the shaped SC-OFDM demodulator 158b of FIG. 9B of the system 150. In step 302, the system 150 removes the appended cyclic prefix time array to generate an M-point input time array. Then, in step 304, the system 150 transforms the M-point time input array to the frequency domain by an M-point discrete Fourier transform (e.g., a 128-point DFT) to generate a shaped M-point input frequency array. In step 306, the system 150 utilizes a matched filter to generate a shaped M-point input filtered frequency array by multiplying the shaped M-point input frequency array and the matched filter. Then, in step 308, the system 150 applies a channel equalizer to the shaped M-point input filtered frequency array to generate a shaped M-point output filtered and equalized frequency array. In step 310, the system 150 down samples the shaped M-point output filtered and equalized frequency array by applying an Alias output spectrum to the shaped M-point output filtered and equalized frequency array to generate an N-point output frequency array. In step 312, the system 150 transforms the N-point output frequency array by an N-point inverse discrete Fourier transform (e.g., a 64-point IDFT) to generate an N-point offset Dirichlet kernel output time array.

Figure 12:
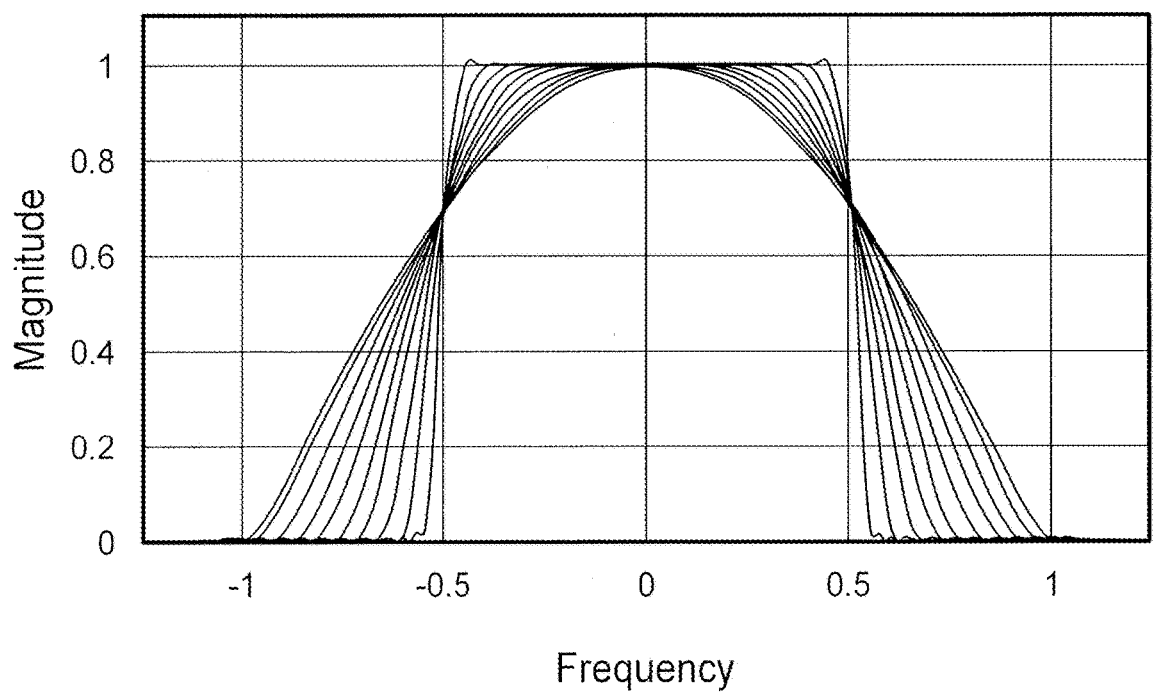
FIG. 12 a graph illustrating a frequency response of a shaped SC-OFDM filter.

FIG. 12 a graph 350 illustrating a frequency response of a shaped SC-OFDM filter. In particular, the graph 350 of FIG. 12 illustrates a frequency response of a rectangle spectrum of a standard SC-OFDM interpolated with a Dirichlet kernel time series and modified by windowing the Dirichlet kernel and circularly convolving the spectrum of each of the Dirichlet kernel time series spectrum and the window. It should be understood that the rectangle spectrum is widened by the circular convolution of the spectrum of each of the Dirichlet kernel time series and window. The resulting spectrum is square rooted and inverse transformed where the SQRT spectrum for the spectral shaping is split at the shaped SC-OFDM modulator 158a and the shaped SC-OFDM demodulator 158b. As shown in FIG. 12, the half amplitude −6 dB gains at the boundaries are 0.707 amplitude indicative of −3 dB gains.

Figure 13:
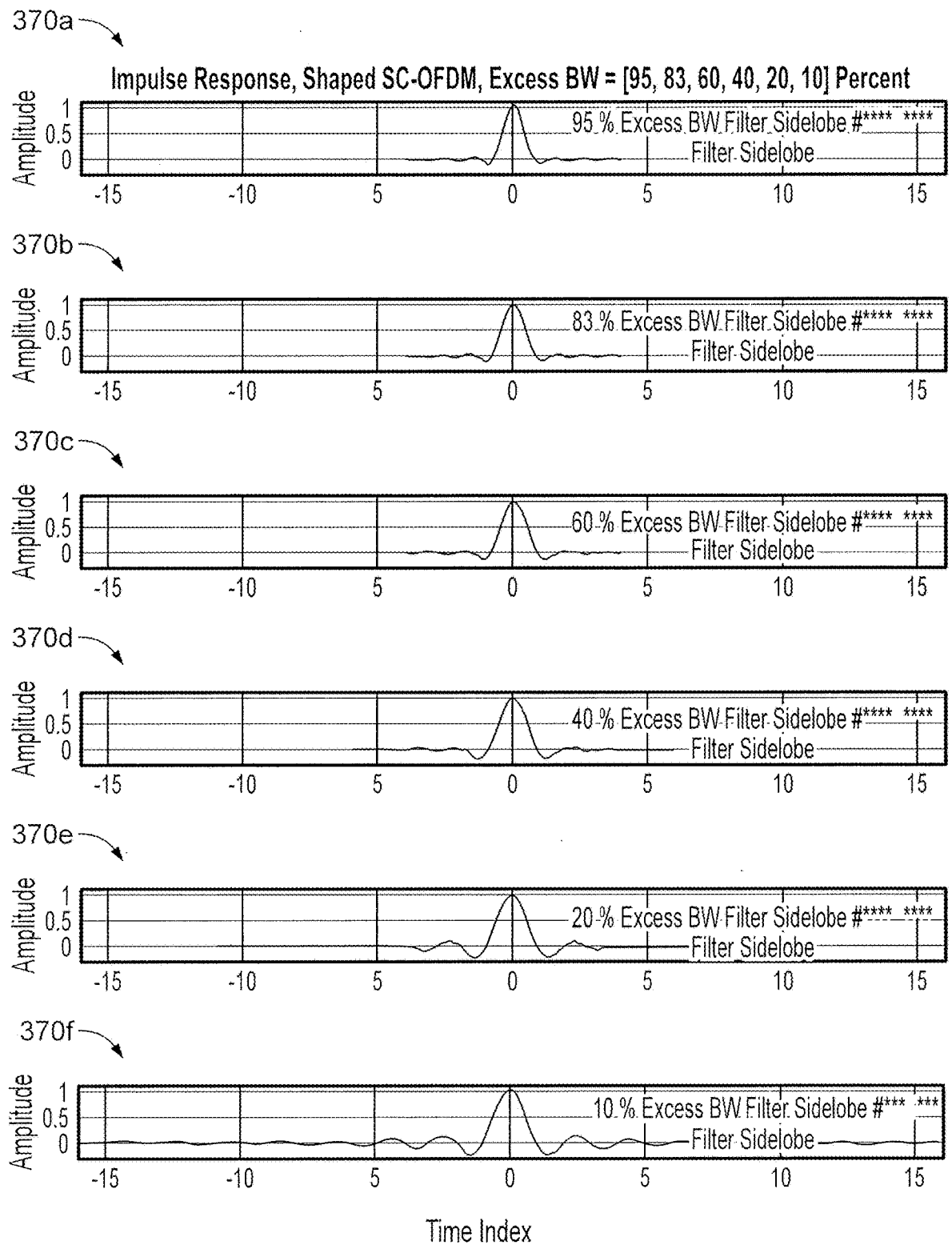
FIG. 13 is a series of graphs illustrating respective impulse responses of a shaped SC-OFDM modulator as a window length of an embedded shaped SC-OFDM filter is shortened.

FIG. 13 is a series of graphs 370a-f illustrating respective impulse responses of a shaped SC-OFDM modulator as a window length of an embedded shaped SC-OFDM filter is shortened. As shown in FIG. 13, the spectra of windowed Dirichlet kernels becomes shorter with lower level side lobes as the window length is shortened.

Figure 14:
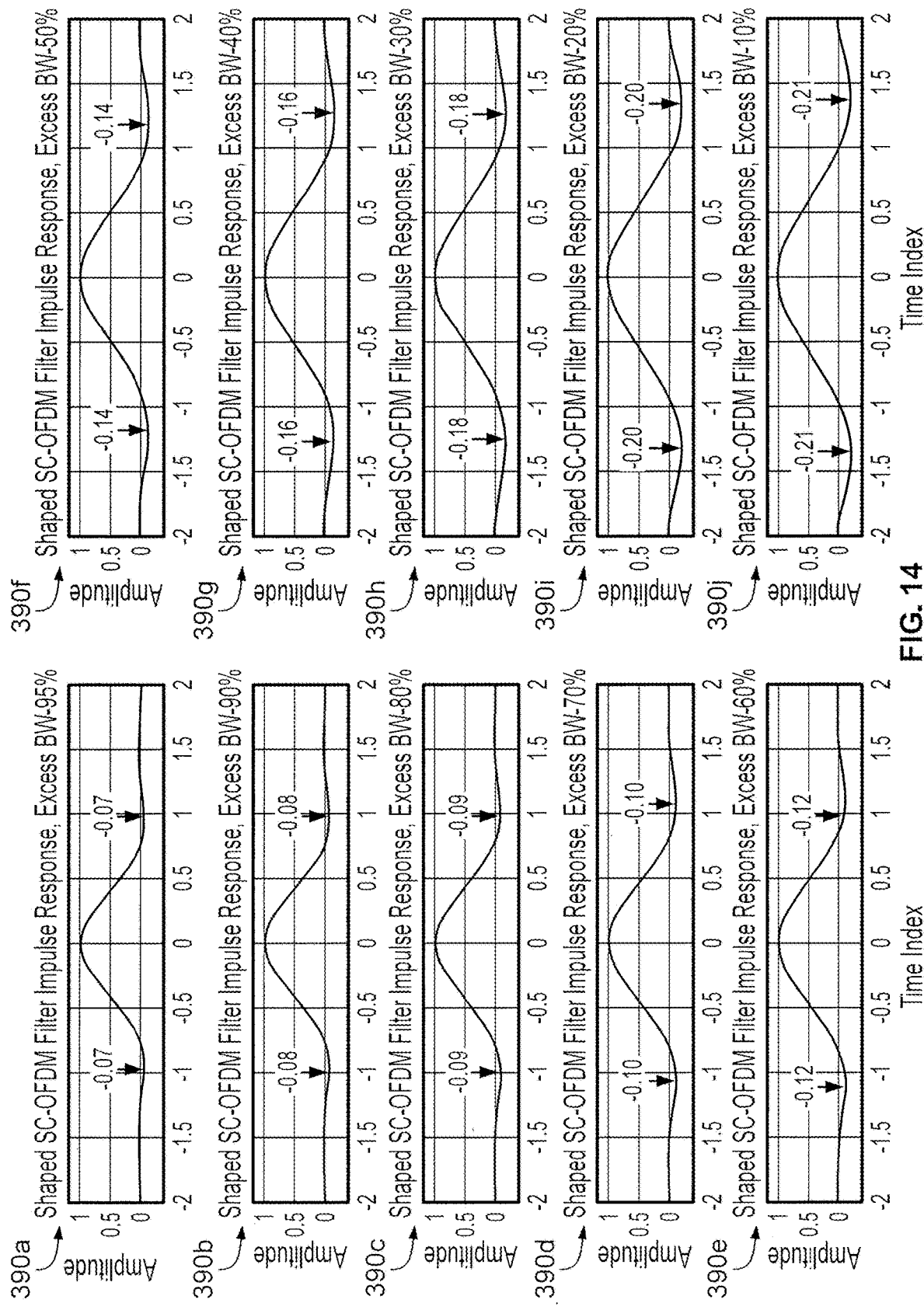
FIG. 14 is a series of graphs illustrating impulse responses of respective shaped SC-OFDM filters.

FIG. 14 is a series of graphs 390a-j illustrating impulse responses of respective shaped SC-OFDM filters. In particular, FIG. 14 illustrates details of the time domain impulse response main lobe and adjacent side lobes with marked levels of different SQRT Nyquist filters embedded in the shaped SC-OFDM modulator 158a. The amplitudes of the highest adjacent side lobes are indicated by the arrows of each graph 390a-j. It should be understood that the reduced level of the side lobes and the diminished number of side lobes provide for reduced levels of PAPR in the modified SC-OFDM modulators.

Figure 15A:
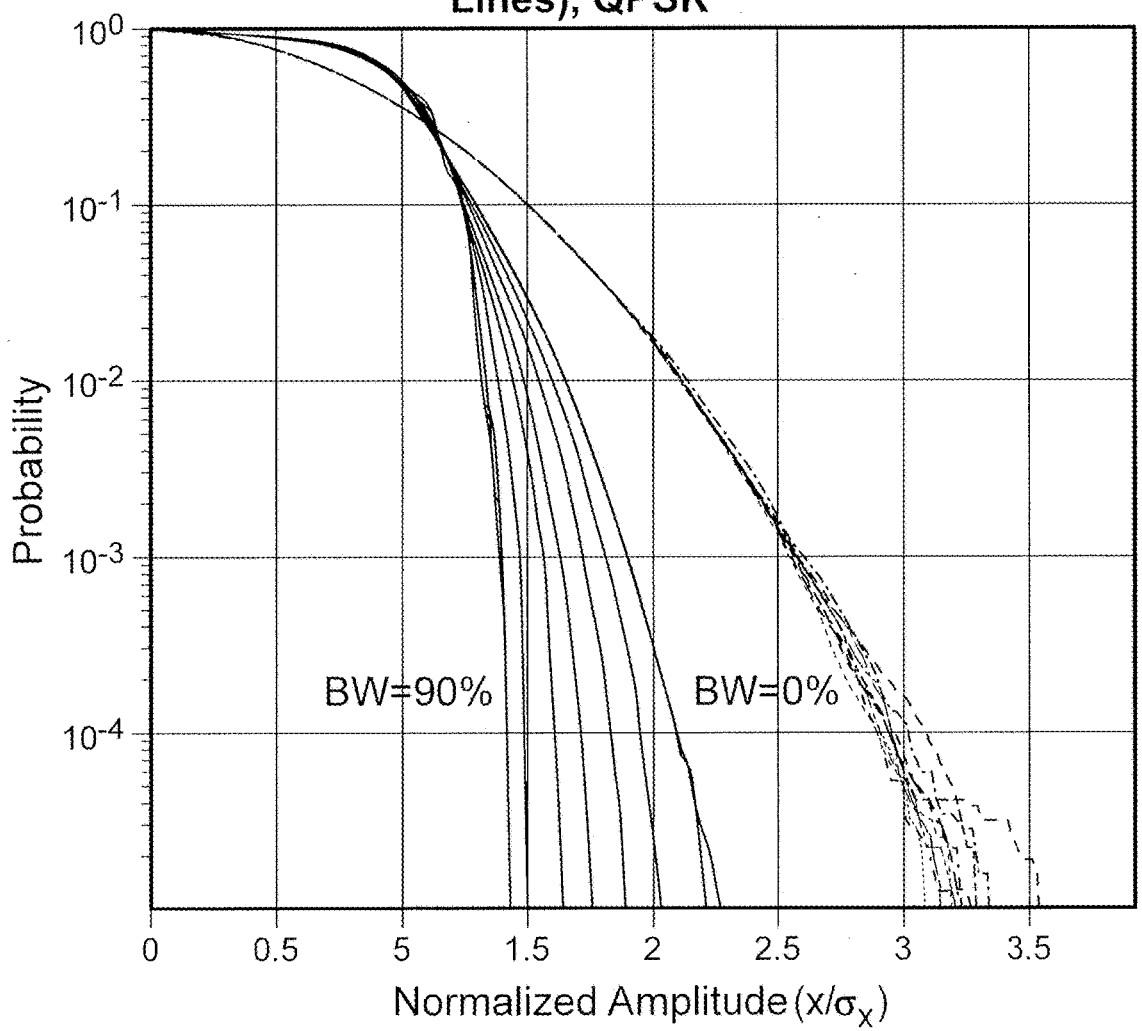
FIGS. 15A-15D are graphs illustrating complementary cumulative density functions of an OFDM modulator, an SC-OFDM modulator, and a shaped SC-OFDM modulator for a range of excess bandwidths.
Figure 15B:
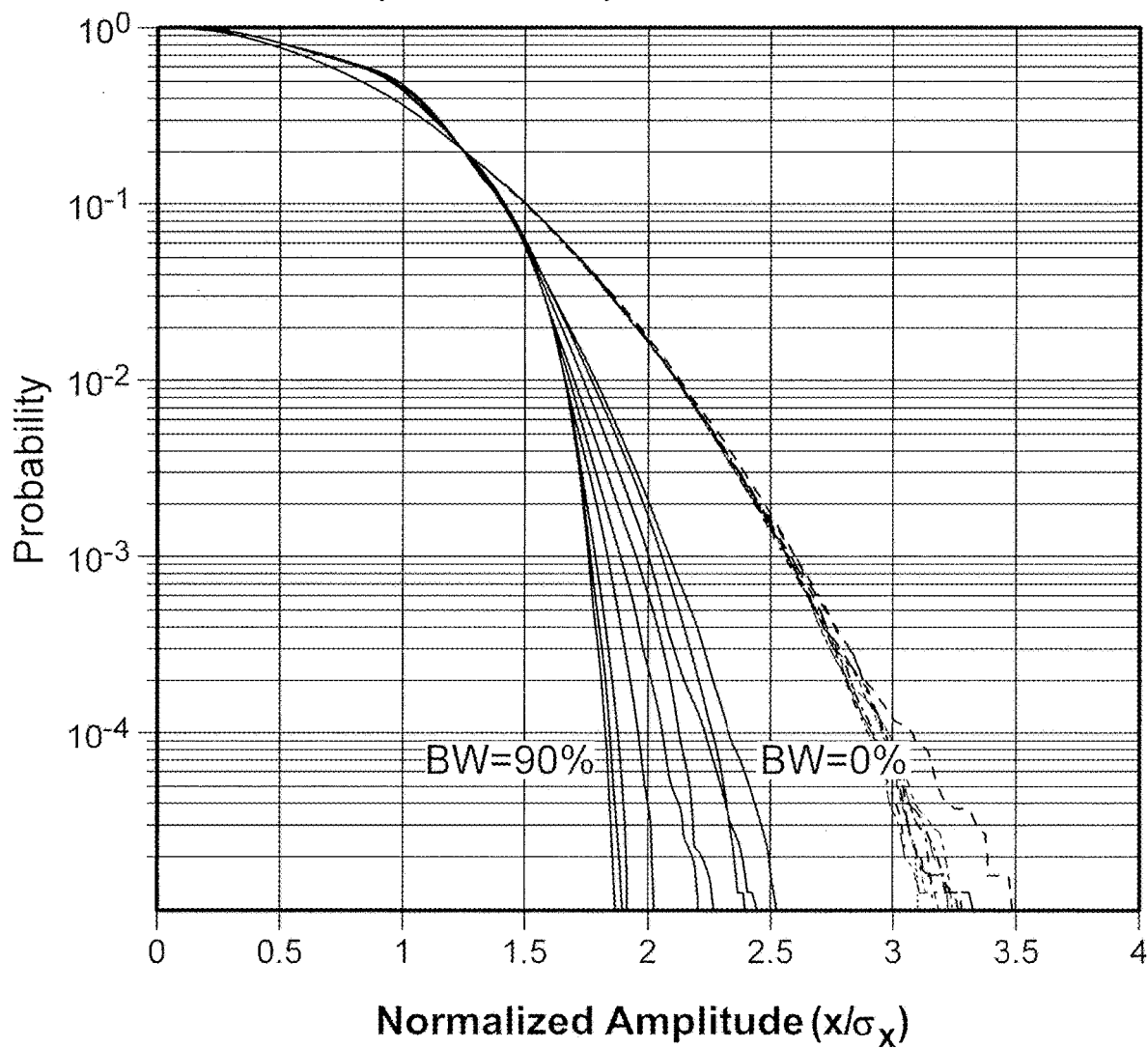
Figure 15C:
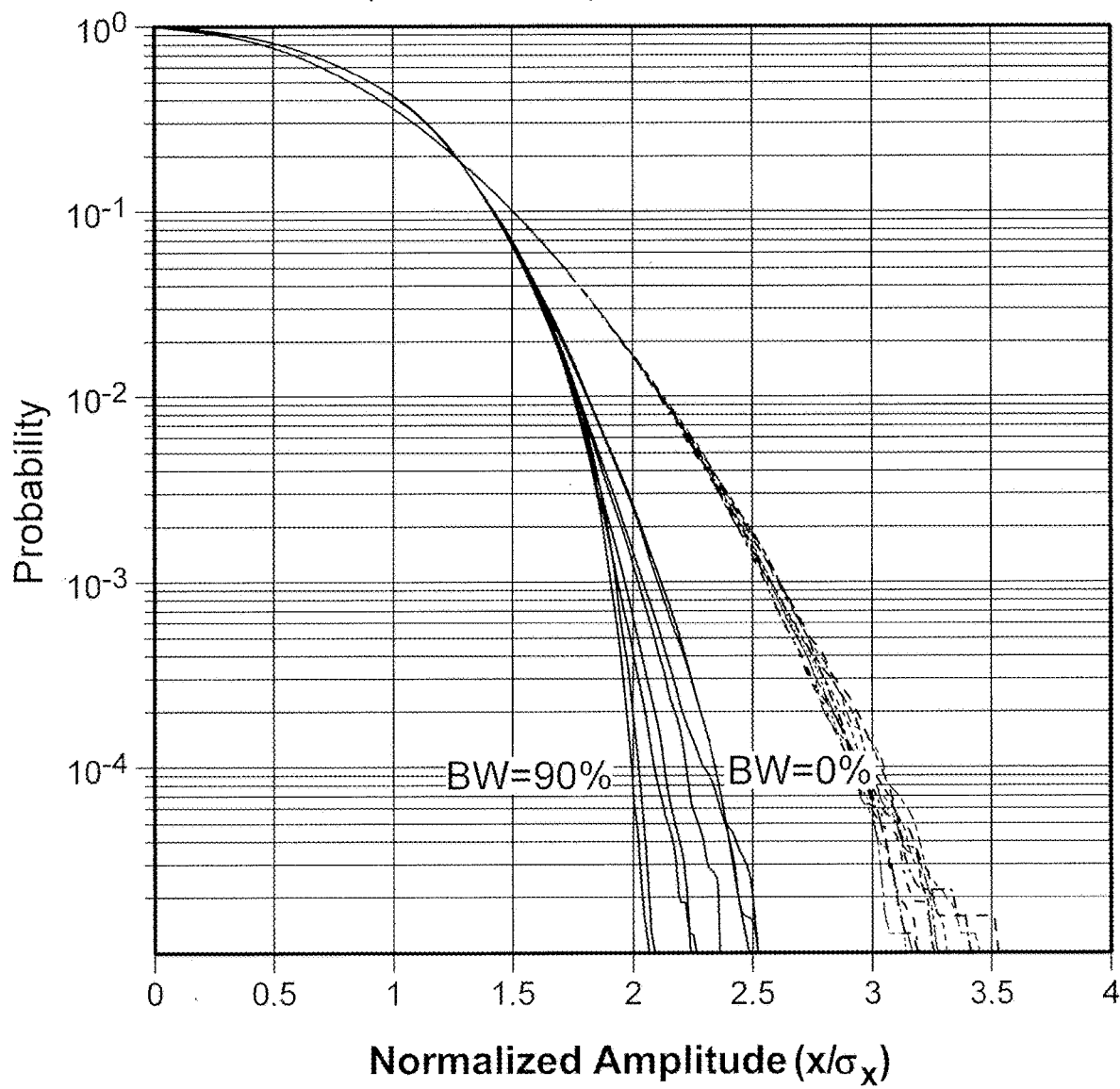
Figure 15D:
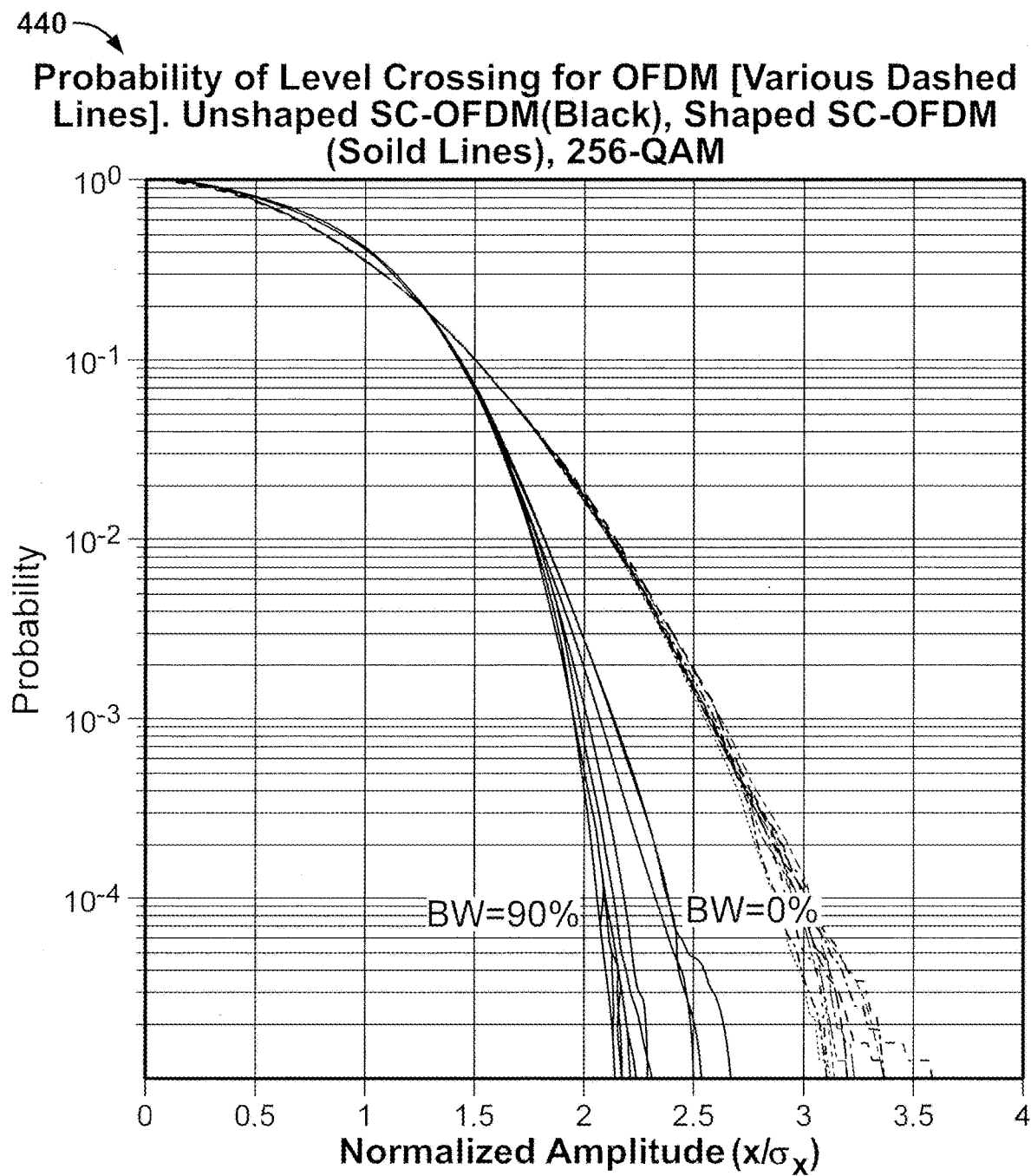

FIGS. 15A-15D are graphs illustrating complementary cumulative density functions of an OFDM modulator, a SC-OFDM modulator and a shaped SC-OFDM modulator for a range of excess bandwidths. FIG. 15A is a graph 410 illustrating the complementary cumulative density functions of an OFDM modulator, a SC-OFDM modulator and a shaped SC-OFDM modulator for a range of excess bandwidths for QPSK constellation. FIGS. 15B-15D are graphs 420, 430, 440 which respectively illustrate the complementary cumulative density functions of an OFDM modulator, a SC-OFDM modulator and a shaped SC-OFDM modulator for a range of excess bandwidths for 16-QAM constellation, 64-QAM constellation and 256-QAM constellation.

Figure 16A:
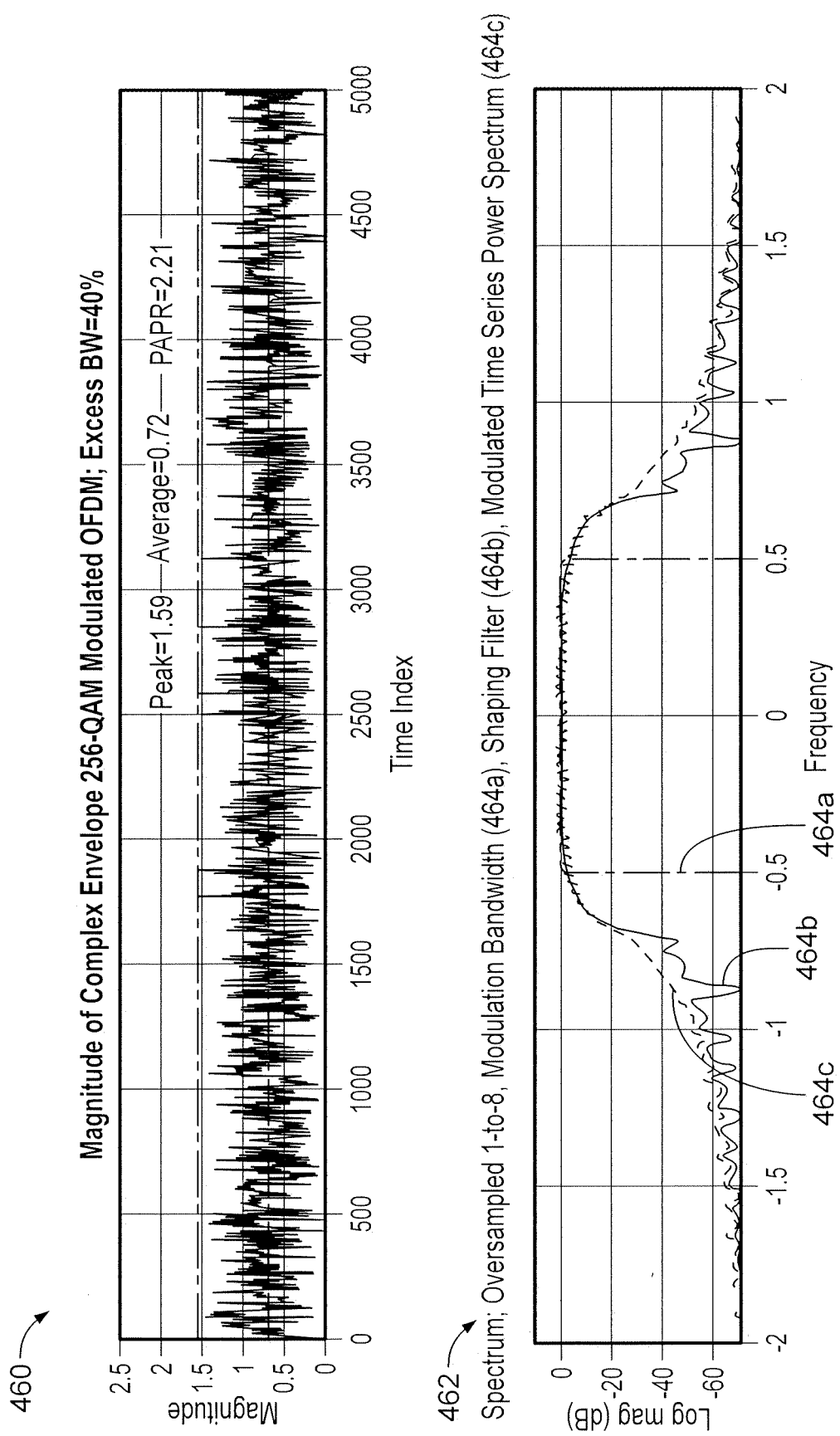
FIGS. 16A-16B are graphs illustrating a magnitude time series of a shaped SC-OFDM demodulator for specified excess bandwidths.
Figure 16B:
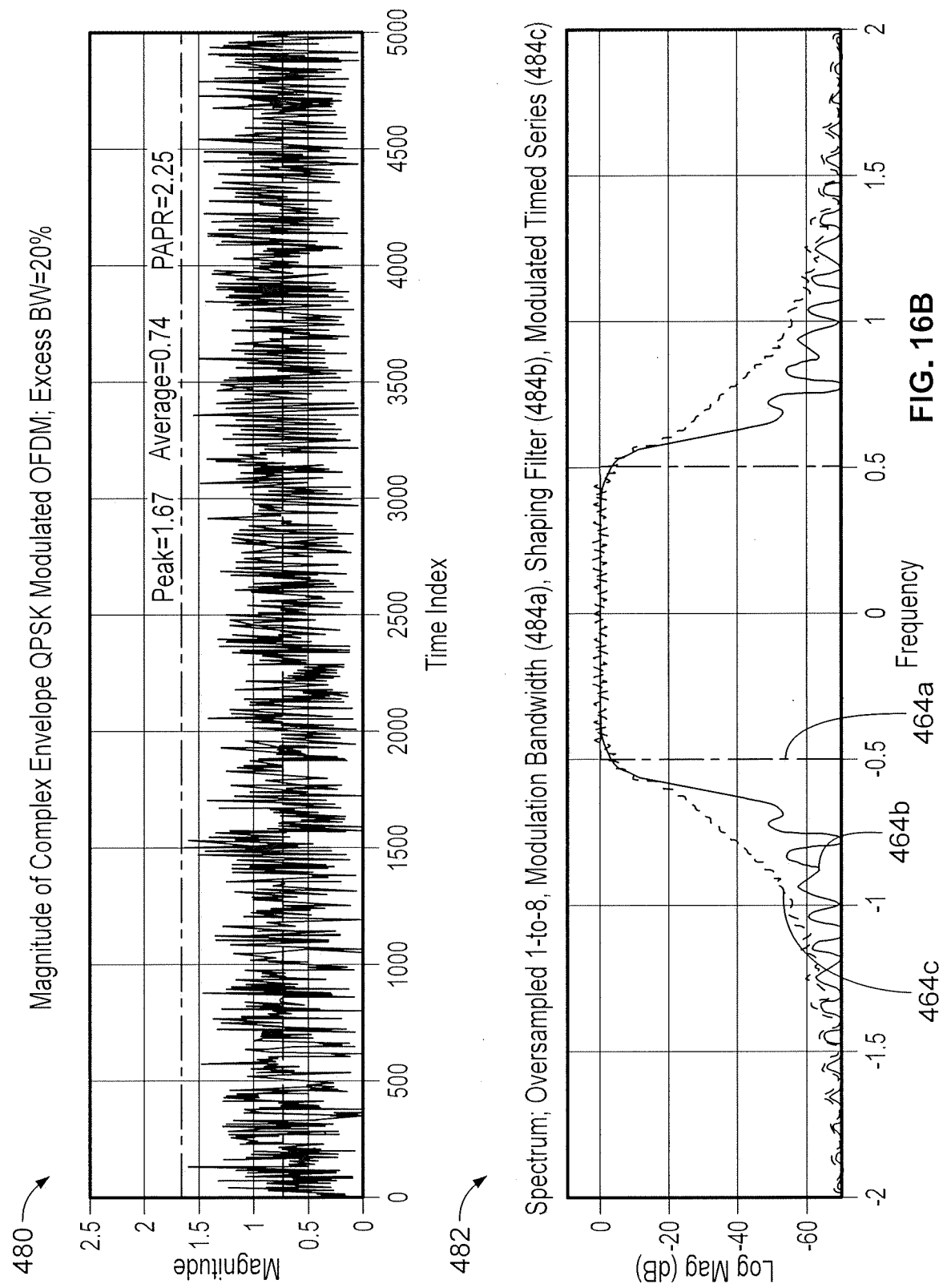

FIGS. 16A-16B are graphs illustrating a magnitude time series of a shaped SC-OFDM demodulator for specified excess bandwidths. In particular, graph 460 of FIG. 16A illustrates a 256-QAM modulated OFDM and graph 462 of FIG. 16A illustrates a modulation bandwidth spectrum 464a, a shaping filter bandwidth spectrum 464b and a modulated time series power spectrum 464c of 1000 symbols. As shown in FIG. 16A, peak and average magnitudes of a segment of the magnitude time series are extracted from 1000 symbols and the 40% excess bandwidth shaping filter spectrum 464b and the power spectrum 464c are formed from an ensemble of 300 realizations. Additionally, graph 480 of FIG. 16B illustrates a QPSK modulated OFDM and graph 482 of FIG. 16B illustrates a modulation bandwidth spectrum 484a, a shaping filter bandwidth spectrum 484b and a modulated time series power spectrum 484c of 1000 symbols. As shown in FIG. 16B, peak and average magnitudes of a segment of the magnitude time series are extracted from 1000 symbols and the 20% excess bandwidth shaping filter spectrum 484b and the power spectrum 484c are formed from an ensemble of 300 realizations.

Figure 17:
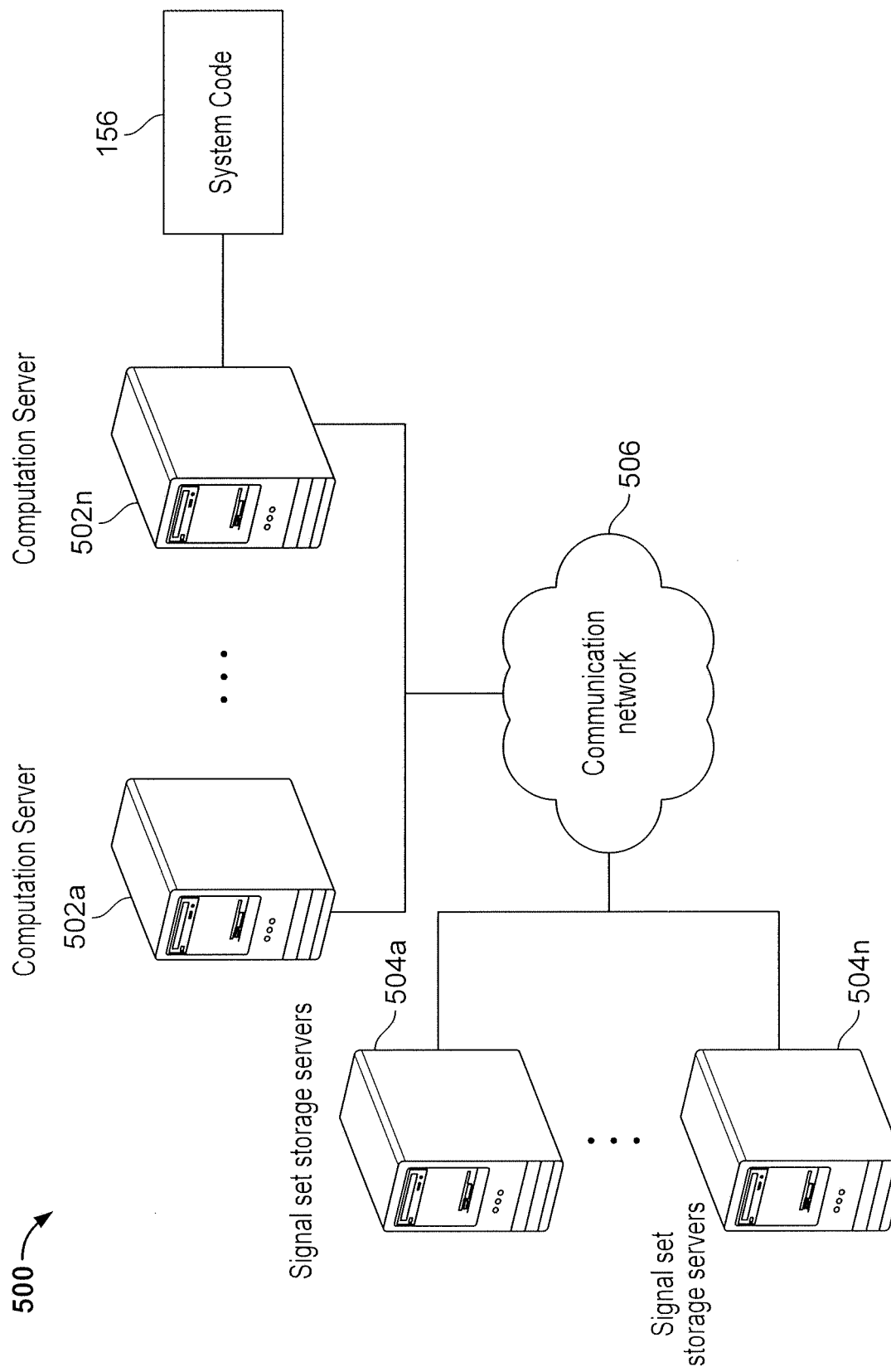
FIG. 17 is a diagram illustrating another embodiment of the system of the present disclosure.

FIG. 17 is a diagram illustrating another embodiment of the system of the present disclosure. In particular, FIG. 17 illustrates additional computer hardware and network components on which the system 500 could be implemented. The system 500 can include a plurality of computation servers 502a-502n having at least one processor and memory for executing the computer instructions and methods described above (which could be embodied as system code 156). The system 500 can also include a plurality of signal set storage servers 504a-504n for storing signal data. The computation servers 502a-502n and the signal set storage servers 504a-504n can communicate over a communication network 506. Of course, the system 500 need not be implemented on multiple devices, and indeed, the system 500 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for modulating a signal, comprising:
a transceiver; and
a processor in communication with the transceiver, the processor:
receiving an input signal from the transceiver; and
modulating the input signal to form Dirichlet kernels in a time domain to generate an offset Dirichlet kernel output time array, each Dirichlet kernel having a main lobe and a plurality of side lobes,
wherein modulating the input signal suppresses a peak to average power ratio of the offset Dirichlet kernel output time array by reducing the plurality of side lobes of each Dirichlet kernel and respective amplitudes of the side lobes, and wherein, in modulating the input signal, the processor inserts an empty guard interval having an interval exceeding a largest delay spread interval between spectral replicates of the input signal in an M-point input frequency array.

2. The system of claim 1, wherein the transceiver is one of a cellular transceiver, a satellite transceiver, a wireless networking transceiver, a short range transceiver, or a radiofrequency transceiver.

3. The system of claim 1, wherein the processor modulates the input signal through single carrier orthogonal frequency division multiplexing.

4. The system of claim 1, wherein the processor modulates the input signal by:
receiving the input signal by an N-point time input array,
transforming the N-point time input array to the frequency domain by a discrete Fourier transform to generate an N-point input frequency array,
replicating the N-point input frequency array to generate the M-point input frequency array where M is greater than N, wherein the replicating of the N-point input frequency array inserts the empty guard interval between spectral replicates of the N-point input frequency array,
utilizing a filter to generate a shaped M-point output filtered frequency array by multiplying the M-point input frequency array and the filter,
transforming the shaped M-point output filtered frequency array by an inverse discrete Fourier transform to generate an M-point offset Dirichlet kernel output time array,
generating a cyclic prefix time array by replicating duration points of an end of the M-point offset Dirichlet kernel output time array, and
appending the cyclic prefix time array to a beginning of the M-point offset Dirichlet kernel output time array to generate an M-point and duration point output time array.

5. The system of claim 4, wherein the empty guard interval is a time gap or an empty spectral interval.

6. The system of claim 4, wherein the filter is a square root cosine tapered Nyquist filter.

7. The system of claim 4, wherein the processor demodulates the M-point and duration point output time array by:
removing the appended cyclic prefix time array to generate an M-point input time array,
transforming the M-point input time array to the frequency domain by a discrete Fourier transform to generate a shaped M-point input frequency array,
utilizing a matched filter to generate a shaped M-point input filtered frequency array by multiplying the shaped M-point input frequency array and the matched filter,
applying a channel equalizer to the shaped M-point input filtered frequency array to generate a shaped M-point output filtered and equalized frequency array,
down sampling the shaped M-point output filtered and equalized frequency array to generate an N-point output frequency array, and
transforming the N-point output frequency array by an inverse discrete Fourier transform to generate an N-point offset Dirichlet kernel output time array.

8. A method for modulating a signal comprising the steps of:
receiving an input signal; and
modulating the input signal to form Dirichlet kernels in a time domain to generate an offset Dirichlet kernel output time array, each Dirichlet kernel having a main lobe and a plurality of side lobes,
wherein modulating the input signal suppresses a peak to average power ratio of the offset Dirichlet kernel output time array by reducing the plurality of side lobes of each Dirichlet kernel and respective amplitudes of the side lobes, and wherein, in modulating the input signal, an empty guard interval is inserted having an interval exceeding a largest delay spread interval between spectral replicates of the input signal in an M-point input frequency array.

9. The method of claim 8, wherein the modulation of the input signal is completed using single carrier orthogonal frequency division modulation.

10. The method of claim 8, wherein the step of modulating the input signal comprises:
receiving the input signal by an N-point time input array,
transforming the N-point time input array to a frequency domain by a discrete Fourier transform to generate an N-point input frequency array,
replicating the N-point input frequency array to generate the M-point input frequency array where M is greater than N, wherein the replicating of the N-point input frequency array inserts the empty guard interval between spectral replicates of the N-point input frequency array,
utilizing a filter to generate a shaped M-point output filtered frequency array by multiplying the M-point input frequency array and the filter,
transforming the shaped M-point output filtered frequency array by an inverse discrete Fourier transform to generate an M-point offset Dirichlet kernel output time array,
generating a cyclic prefix time array by replicating duration points of an end of the M-point offset Dirichlet kernel output time array, and
appending the cyclic prefix time array to a beginning of the M-point offset Dirichlet kernel output time array to generate an M-point and duration point output time array.

11. The method of claim 10, wherein the empty guard interval is a time gap or an empty spectral interval.

12. The method of claim 10, wherein the filter is a square root cosine tapered Nyquist filter.

13. The method of claim 10, further comprising the steps of demodulating the M-point and duration point output time array by:

removing the appended cyclic prefix time array to generate an M-point input time array, transforming the M-point input time array to the frequency domain by the discrete Fourier transform to generate a shaped M-point input frequency array, utilizing a matched filter to generate a shaped M-point input filtered frequency array by multiplying the shaped M-point input frequency array and the matched filter, applying a channel equalizer to the shaped M-point input filtered frequency array to generate a shaped M-point output filtered and equalized frequency array, down sampling the shaped M-point output filtered and equalized frequency array to generate an N-point output frequency array, and transforming the N-point output frequency array by the inverse discrete Fourier transform to generate an N-point offset Dirichlet kernel output time array.

14. A non-transitory computer readable medium having instructions stored thereon for modulating a signal which, when executed by a processor of a transceiver, causes the processor to carry out the steps of:

receiving an input signal; and modulating the input signal to form Dirichlet kernels in a time domain to generate an offset Dirichlet kernel output time array, each Dirichlet kernel having a main lobe and a plurality of side lobes, wherein modulating the input signal suppresses a peak to average power ratio of the offset Dirichlet kernel output time array by reducing the plurality of side lobes of each Dirichlet kernel and respective amplitudes of the side lobes, and wherein, in modulating the input signal, an empty guard interval is inserted having an interval exceeding a largest delay spread interval between spectral replicates of the input signal in an M-point input frequency array.

15. The non-transitory computer readable medium of claim 14, wherein the transceiver is one of a cellular transceiver, a satellite transceiver, a short range transceiver, a wireless networking transceiver, or a radiofrequency transceiver.

16. The non-transitory computer readable medium of claim 14, wherein the modulating of the input signal is completed using single carrier orthogonal frequency division modulation.

17. The non-transitory computer readable medium of claim 14, the processor carrying out the step of modulating the input signal by:

receiving the input signal by an N-point time input array, transforming the N-point time input array to a frequency domain by a discrete Fourier transform to generate an N-point input frequency array, replicating the N-point input frequency array to generate the M-point input frequency array where M is greater than N, wherein the replicating of the N-point input frequency array inserts the empty guard interval between spectral replicates of the N-point input frequency array, utilizing a filter to generate a shaped M-point output filtered frequency array by multiplying the M-point input frequency array and the filter, transforming the shaped M-point output filtered frequency array by an inverse discrete Fourier transform to generate an M-point offset Dirichlet kernel output time array, generating a cyclic prefix time array by replicating duration points of an end of the M-point offset Dirichlet kernel output time array, and appending the cyclic prefix time array to a beginning of the M-point offset Dirichlet kernel output time array to generate an M-point and duration point output time array.

18. The non-transitory computer readable medium of claim 17, wherein the empty guard interval is a time gap or an empty spectral interval.

19. The non-transitory computer readable medium of claim 17, wherein the filter is a square root cosine tapered Nyquist filter.

20. The non-transitory computer readable medium of claim 17, the processor further carrying out the step of demodulating the M-point and duration point output time array by:

removing the appended cyclic prefix time array to generate an M-point input time array, transforming the M-point input time array to the frequency domain by the discrete Fourier transform to generate a shaped M-point input frequency array, utilizing a matched filter to generate a shaped M-point input filtered frequency array by multiplying the shaped M-point input frequency array and the matched filter, applying a channel equalizer to the shaped M-point input filtered frequency array to generate a shaped M-point output filtered and equalized frequency array, down sampling the shaped M-point output filtered and equalized frequency array to generate an N-point output frequency array, and transforming the N-point output frequency array by the inverse discrete Fourier transform to generate an N-point offset Dirichlet kernel output time array.

* * * * *